United States Patent
Romagnolo et al.

(10) Patent No.: US 10,853,826 B2
(45) Date of Patent: Dec. 1, 2020

(54) SYSTEM AND METHOD FOR EVALUATING AND OPTIMIZING MEDIA CONTENT

(71) Applicant: Yeast, LLC, Assonet, MA (US)

(72) Inventors: Brent Aaron Romagnolo, Assonet, MA (US); David Christopher Parkes, Cambridge, MA (US)

(73) Assignee: Yeast, LLC, Assonet, MA (US)

( * ) Notice: Subject to any disclaimer, the term of this patent is extended or adjusted under 35 U.S.C. 154(b) by 0 days.

(21) Appl. No.: 13/762,088

(22) Filed: Feb. 7, 2013

(65) Prior Publication Data

US 2013/0204664 A1  Aug. 8, 2013

Related U.S. Application Data

(60) Provisional application No. 61/596,180, filed on Feb. 7, 2012.

(51) Int. Cl.
  *G06Q 10/00* (2012.01)
  *G06Q 30/02* (2012.01)

(52) U.S. Cl.
  CPC .................. *G06Q 30/0203* (2013.01)

(58) Field of Classification Search
  USPC ............................................... 705/7.29–7.32
  See application file for complete search history.

(56) References Cited

U.S. PATENT DOCUMENTS

| | | | |
|---|---|---|---|
| 2006/0129458 A1* | 6/2006 | Maggio | 705/14 |
| 2007/0288978 A1* | 12/2007 | Pizzurro et al. | 725/112 |
| 2009/0106093 A1* | 4/2009 | Folgner | G06Q 10/10 705/14.61 |
| 2011/0078001 A1* | 3/2011 | Archer et al. | 705/14.2 |
| 2011/0184818 A1* | 7/2011 | Dance | G06Q 10/00 705/16 |
| 2012/0330720 A1* | 12/2012 | Pickton et al. | 705/7.31 |

(Continued)

OTHER PUBLICATIONS

Eliciting Informative Feedback: The Peer-Prediction Method. Management Science, Nolan Miller, Paul Resnick, and Richard Zeckhauser, 51(9): pp. 1-2, 2005. https://www.hks.harvard.edu/fs/rzeckhau/elicit/pdf.*

(Continued)

*Primary Examiner* — Rutao Wu
*Assistant Examiner* — Scott M Ross
(74) *Attorney, Agent, or Firm* — Wilmer Cutler Pickering Hale and Dorr LLP

(57) ABSTRACT

Systems and methods are described for evaluating and optimizing media content. A computer system for evaluating media content includes an input interface configured to receive a media content for evaluation by users in an online community, a media content presenter configured to present the media content to the users in the online community for evaluation, an informative signal monitor configured to gather informative signals relating to the media content from the users in the online community, a media content analyzer configured to evaluate the media content based on the informative signals from the users and generate an analysis result relating to the media content, and an incentive calculator configured to determine an incentive to one of the users in the online community based on the informative signals from the one of the users.

34 Claims, 16 Drawing Sheets

(56) References Cited

U.S. PATENT DOCUMENTS

| | | | | |
|---|---|---|---|---|
| 2013/0311408 | A1* | 11/2013 | Bagga | G06N 20/00 706/12 |
| 2014/0200959 | A1* | 7/2014 | Sarb | G06Q 30/0202 705/7.31 |
| 2017/0061235 | A1* | 3/2017 | Frey | G06K 9/4628 |

OTHER PUBLICATIONS

"Sybil-Resilient Online Content Voting," NSDI '09 Proceedings of the 6th USENIX Symposium on Networked Systems Design and Implementation 2009, pp. 1-3, http://cs.nyu.edu/~lakshmi/nsdi09.pdf.*

Nahid Quader, Md. Osman Gani, Dipankar Chaki, and Md. Haider Ali, "A Machine Learning Approach to Predict Movie Box-Office Success," in 20th International Conference of Computer and Information Technology (ICCIT), Dec. 2017. (Year: 2017).*

H. Pinto, J. Almeida, and M. Gongalves. "Using early view patterns to predict the popularity of youtube videos." WSDM, p. 365-374. ACM, (2013) (Year: 2013).*

Ackerman, et al., "5 Technologies That Will Shape the Web", Spectrum IEEE, pp. 41-45, Jun. 2011, 6 pages.

Ainslie, et al., "Modeling Movie Life Cycles and Market Share", Marketing Science, 24(3):508-517, Summer 2005, 10 pages.

Arndt, "Bluefin Mines Social Media to Improve TV Analytics", Fast Company Magazine, Dec. 2011/Jan. 2012, accessed Sep. 12, 2013, 6 pages.

Asur, et al., "Predicting the Future With Social Media", Cornell University Library, arXiv:1003.5699, submitted Mar. 29, 2010, 9 pages.

Bass, "A New Product Growth for Model Consumer Durables", Management Science, 15(5):215-227, Jan. 1969, 14 pages.

Basuroy, et al., "How Critical Are Critical Reviews? The Box Office Effects of Film Critics, Star Power, and Budgets", Journal of Marketing, 67:103-117, Oct. 2003, 15 pages.

Blumberg, et al., "BOXEE: A Marketing Plan", Final Project for MBA Marketing Management, Baruch College Zicklin School of Business, Dec. 2010, 32 pages.

Boatwright, et al., "Reviewing the Reviewers: The Impact of Individual Film Critics on Box Office Performance", Quant. Market Econ, 5:401-425, Aug. 2007, 25 pages.

Borge-Holthoefer, et al., "Structural and Dynamical Patterns on Online Social Networks: The Spanish May 15th Movement as a Case Study", PLoS One, 6(4):e23883, Aug. 2011, 8 pages.

Camerer, "Can Asset Markets Be Manipulated? A Field Experiment with Racetrack Betting", Journal of Political Economy, 106(3):457-482, Jun. 1998, 26 pages.

Chen et al., "Predicting the Future", Information Systems Frontiers, 5(1):47-61, Jan. 2003, 15 pages.

Clemen, "Combining Forecasts: A Review and Annotated Bibliography", International Journal of Forecasting, 5:559-583, No Month Available, 1998, 25 pages.

Craig, et al., "Culture Matters: Consumer Acceptance of U.S. Films in Foreign Markets", Journal of International Marketing, 13(4):80-103, Dec. 2005, 24 pages.

Dellarocas, et al., "Exploring the Value of Online Reviews to Organizations: Implications for Revenue Forecasting and Planning", Twenty-Fifth International Conference on Information Systems, ICIS 2004 Proceedings, Paper 30, pp. 379-386, Dec. 2004, 9 pages.

Dellarocas, et al., "A Statistical Measure of a Population's Propensity to Engage in Post-Purchase Online Word-of-Mouth", Statistical Science, 21(2):277-285, Sep. 2006, 9 pages.

Dempster, et al., "Maximum Likelihood from Incomplete Data via the EM Algorithm", Journal of the Royal Statistical Society, Series B (Methodological), 39(1):1-38, No Month Available, 1977, 39 pages.

Desilva, "Chapter 9: Consumer Selection of Motion Pictures", in The Motion Picture Mega-Industry, Allyn and Bacon, 1998, pp. 144-171, 16 pages.

De Vany, et al., "Uncertainty in the Movie Industry: Does Star Power Reduce the Terror of the Box Office?", Presented at the Annual Meeting of the American Economic Association, New York, Jan. 1999, 51 pages.

De Vany, et al., "Bose-Einstein Dynamics and Adaptive Contracting in the Motion Picture Industry", The Economic Journal, 106(439):1493-1514, Nov. 1996, 23 pages.

Dick, "Boob Tube vs. YouTube", Broadcast Engineering, Oct. 1, 2010, accessed Sep. 12, 2013, 3 pages.

Dodds, et al., "Temporal Patterns of Happiness and Information in a Global Social Network: Hedonometrics and Twitter", PLoS One, 6:e26752, Dec. 2011, 57 pages.

Duan, et al., "Do Online Reviews Matter?—An Emperical Investigation of Panel Data", Decision Support Systems, 45:1007-1016, Apr. 2008, 10 pages.

Elberse, et al., "Demand and Supply Dynamics for Sequentially Released Products in International Markets: The Case of Motion Pictures", Marketing Science, 22(3):329-354, Summer 2003, 27 pages.

El-Hage, et al., "Legendary Pictures & ABRY Partners", Harvard Business School Case Study 9-210-094, Jun. 30, 2010, 19 pages.

Eliashberg, et al., "Evolutionary Approach to the Development of Decision Support Systems in the Movie Industry", Decision Support Systems, 47:1-12, Jan. 2009, 12 pages.

Eliashberg, et al., "Film Critics: Influencers or Predictors?", Journal of Marketing, 61:68-78, Apr. 1997, 11 pages.

Eliashberg, et al., "From Story Line to Box Office: A New Approach for Green-Lighting Movie Scripts", Management Science, 53(6):881-893, Jun. 2007, 13 pages.

Eliashberg, et al. "MOVIEMOD: An Implementable Decision Support System for Pre-Release Market Evaluation of Motion Pictures", Marketing Science, 19(3):226-243, Summer 2000, 46 pages.

Eliashberg, et al., "Implementing and Evaluating SilverScreener: A Marketing Management Support System for Movie Exhibitors", Interfaces, 31(3):5108-5127, May-Jun. 2001, 21 pages.

Ginsberg, et al., "Detecting Influenza Epidemics Using Serch Engine Query Data", http://dx.doi.org/10.1038/nature07634; Nature, vol. 457, Feb. 19, 2009, 5 pages.

Godbole, et al., "Large-Scale Sentiment Analysis for News and Blogs", ICWSM '2007, Mar. 26-28, 2007, Bouler, Colorado, 4 pages.

Godes, et al., "Firm-Created Word-of-Mouth Communication: A Field-Based Quasi-Experiment", Harvard Business School Marketing Research Paper, No. 04-03, Jul. 2004, 29 pages.

Godes, et al., "Using Online Conversations to Study Word of Mouth Communication", Marketing Science, 23(4):545-560, Fall 2004, 16 pages.

Goel, et al., "Predicting Consumer Behavior with Web Search", PNAS, 107(41):17486-17490, www.pnas.org/cgi/doi/10.1073/pnas.1005962107, Oct. 12, 2010, 5 pages.

Gruca, et al., "The Effect of Electronic Markets on Forecasts of New Product Success", Information Systems Frontiers, 5:1(95-105), Jan. 2003, 11 pages.

Gruhl, et al., "The Predictive Power of Online Chatter", Research Track Paper, ACM, KDD '05, Aug. 21-24, 2005, Chicago, Illinois, pp. 78-87, 10 pages.

Gruhl, et al., "Information Diffusion Through Blogspace", Proceedings of the 13th International World Wide Web Conference (WWW '04), May 2004, pp. 491-501, 24 pages.

Hackathorn, Web Farming for the Data Warehouse: Exploiting Business Intelligence and Knowledge Management, in its entirety, Morgan Kauvmann Publishers, Inc., San Francisco, California, submitting Table of Contents and Representative Chapter 1, 1999, 42 pages.

Hanson, "Chapter 7: Decision Markets for Policy Advice", Promoting the General Welfare: New Perspectives on Government Performance, Brookings Institution Press, pp. 151-173, 2006, 14 pages.

Hanson, "Decision Markets", IEEE Intelligent Systems, 14(3):16-19, May/Jun. 1999, 5 pages.

(56) References Cited

OTHER PUBLICATIONS

Hearst, "Building Intelligent Systems One e-Citizen at a Time", IEEE Intelligent Systems, May/Jun. 1999, pp. 16-20, 5 pages.
Hecht, "Tweets from Justin Bieber's Heart: The Dynamics of the "Location" Field in User Profiles", CHI 2011, May 7-12, 2011, Vancouver, BC, Canada, 2011, 10 pages.
Huberman, et al., "Social Networks that Matter: Twitter Under the Microscope", First Monday, 14(1-5), Jan. 2009, http://firstmonday.org/ojs/index/php/fm/rt/printerFriendly/2317/2063, accessed Sep. 11, 2013, 9 pages.
Huberman, et al., "Status as a Valued Resource", Social Psychology Quarterly, 67(1):103-114, Jan. 2004, 12 pages.
Jansen, et al., "Twitter Power: Tweets as Electronic Word of Mouth", Journal of the American Society for Information Science and Technology, 60(11):2169-2188, Jan. 2009, 20 pages.
Jedidi, et al., "Clustering at the Movies", Hong Kong University of Science and Technology, Business School, Series No. MKTG 98.110, Apr. 1998, 22 pages.
Jenkins, *Convergence Culture: Where Old and New Media Collide*, NYU Press, in its entirety, submitting Table of Contents and Introduction as representation, 2006, 38 pages.
Jensen, "Data Mining in Social Networks", Computer Science Department Facility Publication Series, Paper 67, University of Massachusetts—Amherst, 2002, No Month Available, 14 pages.
Joshi, et al., "Movie Reviews and Revenues: An Experiment in Text Regression", Human Language Technologies: The 2010 Annual Conference of the North American Chapter of the ACL, Los Angeles, California, Jun. 2010, pp. 293-296, 4 pages.
Joshi, et al., "C-Feel-It: A Sentiment Analyzer for Micro-blogs", Proceedings of the ACL-HLT 2011 System Demonstrations, Portland, Oregon, Jun. 21, 2011, pp. 127-132, 6 pages.
Khrabrov, et al., "Discovering Influence in Communication Networks using Dynamic Graph Analysis", 2010 IEEE Second International Conference on Social Computing, Minneapolis, MN, Aug. 20-22, 2010, 8 pages.
Krauss, et al., "Predicting Movie Success and Academy Awards Through Sentiment and Social Network Analysis", 16th European Conference Information Systems, Manuscript ID: ECIS2008-SOC-REG-014.R1, Scholar One Manuscript Central, Jun. 9-11, 2008, 13 pages.
Krider, et al., "Competitive Dynamics and the Introduction of New Products: The Motion Picture Timing Game", Journal of Marketing Research, vol. 35, No. 1, Feb. 1998, 15 pages.
Leskovec, et al., "The Dynamics of Viral Marketing", ACM Transactions on the Web (TWEB), vol. 1, Issue 1, Article 5, May 2007, 47 pages.
Litman, "Predicting Success of Theatrical Movies: An Empirical Study", Journal of Popular Culture, 16(4):159-175, Spring 1983, 20 pages.
Litman, "Predicting Financial Success of Motion Pictures: The '80's Experience", Journal of Media Economics, Fall 1989, pp. 35-50, 16 pages.
Litman, "Chapter 10: Predicting Financial Success of Motion Pictures: The Early '90s Experience", in *The Motion Picture Mega-Industry*, Allyn and Bacon, 1998, pp. 172-197, 15 pages.
Liu, "Word of Mouth for Movies: Its Dynamics and Impact on Box Office Revenue", Journal of Marketing, 70:74-89, Jul. 2006, 17 pages.
Liu, "ARSA: A Sentiment-Aware Model for Predicting Sales Performance Using Blogs", SIGIR 2007 Proceedings: Session 25 Combination and Fusion, Amsterdam, The Netherlands, Jul. 23-27, pp. 607-614, 2007, 8 pages.
Lloyd, et al., "Lydia: A System for Large-Scale News Analysis (Extended Abstract)", SPIRE 2005, LNCS 3772, pp. 161-166, Nov. 2-4, 2005, 6 pages.
Mahajan, et al., *New-Product Diffusion Models*, in its entirety, Springer, submitting Table of Contents and Representative Chapter 1, 2000, 29 pages.
Metaxas, et al., "How (Not) to Predict Elections", IEEE Third International Conference on Privacy, Security, Risk and Trust (passat) and IEEE Third International Conference on Social Computing (socialcom), Boston, MA, Oct. 9-11, 2011, 8 pages.
Mishne, et al., "Predicting Movie Sales from Blogger Sentiment", American Association for Artificial Intelligence (www.aaai.org), AAAI 2006 Spring Symposium on Computational Approaces to Analysing Weblogs, Mar. 27-29, 2006 4 pages.
Moretti, "Social Learning and Peer Effects in Consumption: Evidence from Movie Sales", Review of Economic Studies, 78:356-393, No Month Available, 2011, 38 pages.
Munoz, "High-Tech Word of Mouth Maims Movies in a Flash", Los Angeles Times, Aug. 17, 2003, accessed Sep. 12, 2013, 3 pages.
Mustafaraj, et al., "Vocal Minority versus Silent Majority: Discovering the Opinions of the Long Tail", IEEE Third International Conference on Privacy, Security, Risk and Trust (passat) and IEEE Third International Conference on Social Computing (socialcom), Boston, MA, Oct. 9-11, 2011, 9 pages.
Neelamegham, et al., "A Bayesian Model to Forecast New Product Performance in Domestic and International Markets", Marketing Science, 18(2):115-136, Spring 1999, 22 pages.
Nov, "What Motivates Wikipedians?", Communications of the ACM, 50(11):60, 62-64, Nov. 2007, 5 pages.
O'Connor, et al., "From Tweets to Polls: Linking Text Sentiment to Public Opinion Time Series", Tepper School of Business, paper 559, Jan. 2010, 9 pages.
Oghina, et al., "Predicting IMDB Movie Ratings Using Social Media", ISLA, University of Amsterdam, 34th European Conference on IR Research, ECIR 2012, Barcelona, Spain, Apr. 1-5, 2012, 5 pages.
Oreg, et al., "Exploring Motivations for Contributing to Open Source Initiatives: The Roles of Contribution Context and Personal Values", Computers in Human Behavior, 24(5):2055-2073, Sep. 2008, 19 pages.
Pang, et al., "Opinion Mining and Sentiment Analysis", Foundations and Trends in Information Retrieval, 2(1-2):1-135, Jan. 2008, 137 pages.
Pang, et al., "Seeing Stars: Exploiting class relationships for sentiment categorization with respect to rating scales", Proceedings of ACL, No Month Available 2005, 10 pages.
Pang, et al., "Thumbs Up? Sentiment Classification using Machine Learning Techniques", Proceedings of EMNLP, Jul. 2002, 8 pages.
Pennock, et al., "Extracting Collective Probabilistic Forecasts from Web Games", Proceedings of the Seventh ACM SIGKDD International Conference on Knowledge Discovery and Data Mining (KDD-2001), New York, Aug. 2001, 10 pages.
Pennock, et al., "The Real Power of Artificial Markets", eBusiness Research Center Working Paper Aug. 2001, PennState, Science, 291:987-988, Feb. 9, 2001, 3 pages.
Ravid, "Information, Blockbusters, and Stars: A Study of the Film Industry", Journal of Business, 72(4):463-492, Oct. 1999, 30 pages.
Reisinger, "Extracting Latent Exonomic Signal from Online Activity Streams", Second Workshop on Computational Social Science and the Wisdom of Crowds, Second Poster Session, Second Workshop on Computational Social Science and the Wisdom of Crowds, NIPS . Dec. 2011, 10 pages.
Rhode, et al., "Manipulating Political Stock Markets: A Field Experiment and a Century of Observational Data", http://ideas.repec.org/p/feb/natura/00325.html, Jan. 2007, 59 pages.
Roberts, et al., "Understanding the Motivations, Participation, and Performance of Open Source Software Developers: A Longitudinal Study of the Apache Projects", Management Science, 52(7):984-999, Jul. 2006, 17 pages.
Sawhney, et al., "A Parsimonioius Model for Forecasting Gross Box-Office revenues of Motion Pictures", Marketing Science, 15(2):113-131, Jun. 1996, 19 pages.
Sharda, et al., "Predicting Box-Office Success of Motion Pictures with Neural Networks", Expert Systems with Applications, 30:243-254, Feb. 2006, 12 pages.
Simonoff, et al., "Predicting Movie Grosses: Winners and Losers, Blockbusters and Sleepers", NYU Working Paper No. SOR-99-8, No Month Available, 1999, 41 pages.
Sochay, "Predicting the Performance of Motion Pictures", Journal of Media Economics, 7(4):1-20, Sep. 1994, 20 pages.

(56) References Cited

OTHER PUBLICATIONS

Spann, et al., "Internet-Based Virtual Stock Markets for Business Forecasting", Management Science, 49(10):1310-1326, Oct. 2003, 17 pages.

Stork, "The Open Mind Initiative", IEEE Intelligent Systems, 14(3):19-20, May/Jun. 1999, 2 pages.

Swami, et al., "SilverScreener: A Modeling Approach to Movie Screens Management", Marketing Science, Special Issue on Managerial Decision Making, 18(3):352-372, Summer 1999, 22 pages.

Terry, et al., "The Determinants of Domestic Box Office Performance in the Motion Picture Industry", Southwestern Economic Review, 32(1):137-148, Spring 2005, 14 pages.

Tran et al., "Sybil-Resilient Online Content Rating", Courant Institute of Mathematical Sciences, No Month Available 2009, 16 pages.

Valenti, "Motion Pictures and their Impact on Society in the Year 2001", Midcontinent Perspectives, Midwest Research Institute, Kansas City, Missouri, Apr. 25, 1978, 14 pages.

Wolfers, et al., "Prediction Markets", Stanford Institute for Economic Policy Research, Discussion Paper No. 03-25. Apr. 19, 2004, 28 pages.

Wolfers, et al., "Three Tools for Forecasting Federal Elections: Lessons from 2001", Graduate School of Business, Stanford University, Research Paper Series, Research Paper No. 1723, Nov. 2001, 24 pages.

Wu, et al., "Feedback Loops of Attention in Peer Production", HP Labs, Palo Alto, California, arXiv:0905.1740v1 [cs.CY] May 12, 2009, 18 pages.

Yu, et al., "SybilLimit: A Near-Optimal Social Network Defense against Sybil Attacks", IEEE Symposium on Security and Privacy, May 18-21, 2008, 12 pages.

Yu, et al., "SybilGuard: Defending Against Sybil Attacks via Social Networks", Proceedings of the ACE SIGCOMM Conference on Computer Communications (SIGCOMM 2006), Pisa, Italy, Sep. 11-15, 2006, 12 pages.

Yu, et al., "SybilLimit: A Near-Optimal Social Network Defense Against Sybil Attacks", IEEE/ACM Transactions on Networking, 18(3):885-898, Jun. 2010, 14 pages.

Zhang, et al., "Improving Movie Gross Prediction Through News Analysis", 2009 IEEE/WIC/ACM International Joint Conference on Web Intelligence and Intelligent Agent Technology, Sep. 15-18, 2009, Milan, Italy, pp. 301-304, 4 pages.

Zufryden, "Linking Advertising to Box Office Performance of New Film Releases—a Marketing Planning Model", Journal of Advertising Research, Jul. 1, 1996, accessed through www.accessmylibrary.com, Feb. 18, 2013, 3 pages.

\* cited by examiner

USER DIGITAL DOLLAR BALANCE FOR UPLOAD

UPLOAD | CREDIT: 85 POINTS | / 310

FILE: My Movies / 320

SCARY 12 ☐

FUN 2 ☒

DODGEBALL ☐

OK

TAGS / 330

- SILLY
- FRAT
- GOOFY
- COLLEGE

METADATA / 340

AUTHOR : BR
GENRE : COLLEGE
MEDIA : DIG-CAM
LOCATION : RI
. . .
. . .

TEST AUDIENCES: / 350

16-19 ☒

MALE ☒

US –EAST ☒

•
•

PLATFORM GOAL: / 360

MAX EXPOSURE ☐

SELECTIVE TEST ☒

INVESTMENT ☐

QUICK MEASURE ☐

Mobile Device

FIG. 6

| | 602 | 604 | 606 | 608 | 610 | 612 | 614 |
|---|---|---|---|---|---|---|---|
| | | PLATFORM SCORE | CONTENT | VOTE | INVEST POINTS | FRIEND INTEREST | REVENUE PREDICTION |
| [HOT] | | 88% | C1 | ☒ | ($$) | 10% | $10M-$15M |
| | | 82% | C2 | ☐ | ($$) | | |
| RISING | | 70% | C3 | ☐ | | | |
| | | 70% | C4 | ☒ | | | |
| | | 66% | C5 | ☐ | | | $1M-$5M |
| | | 51% | C6 | ☐ | ($$) | 21% | |
| EARLY | | 24% | C10 | ☐ | ($) | 2% | <$1M |

USER ENGAGEMENT PANEL — 600

FIG. 7

CASH IN POINTS

| 710 | 720 |
|---|---|
| SKYPE WITH STAR | 1,000 |
| CONCERT TIX | 100 |
| MY CONTENT EVALUATED | 500 |
| INVEST IN CONTENT | 100 |
| FOUR WEBISODES | 5 |
| BADGE TO USER | 20 |
| MERCHANDISE | 10-100 |
| . . . . | |

# SYSTEM AND METHOD FOR EVALUATING AND OPTIMIZING MEDIA CONTENT

RELATED APPLICATION

This application claims priority to U.S. Provisional Patent Application 61/596,180 filed on Feb. 7, 2012, which is incorporated herein by its entirety.

FIELD

The disclosed subject matter generally relates to media content and, more particularly, to evaluating and optimizing media content.

BACKGROUND

The digital revolution is having a dramatic effect on the economics of media content. Not only can media content now be cheaply produced at any scale, for example with digital video cameras and the use of commodity hardware for post-production, but media content can be distributed at what is effectively zero marginal cost over the Internet directly to consumers. User demand can be matched to a long tail of different types of media content, allowing the supply of niche media content to be matched with niche user demand. The cost of reaching niche user markets is falling dramatically, thanks to a combination of forces including: digital distribution, powerful search technologies and a critical mass of broadband penetration.

There exists a growing interest in the role of the Internet and the social media platform in reflecting user opinion and enabling forecasts about future events, including the demand for products. But despite this need, the ability to estimate demand and market value for media content remains limited.

SUMMARY

In accordance with the disclosed subject matter, systems and methods are described for evaluating and optimizing media content.

Disclosed subject matter includes, in one aspect, a computer system for evaluating media content, which includes an input interface configured to receive a media content for evaluation by users in an online community, a media content presenter configured to present the media content to the users in the online community for evaluation, an informative signal monitor configured to gather informative signals relating to the media content from the users in the online community, a media content analyzer configured to evaluate the media content based on the informative signals from the users and generate an analysis result relating to the media content, and an incentive calculator configured to determine an incentive to one of the users in the online community based on the informative signals from the one of the users.

In some embodiments, the incentive calculator is configured to determine the incentive to the one of the users in the online community at least partially based on the analysis result of the media content analyzer.

In some other embodiments, the incentive calculator is configured to determine the incentive to the one of the users in the online community based on at least one of (1) informative signals from other users in the online community, (2) weight assigned to the informative signals from the one of the users by the media content analyzer in evaluating the media content, (3) correlation between the informative signals from the one of the users and a gold standard action associated with the media content, (4) time of the informative signals from the one of the users relative to time of the informative signals from the other users, (5) matching of the informative signals from the one of the users with the informative signals from the other users, (6) quality of the informative signals from the one of the users, and (7) ranking of the informative signals from the one of the users among the informative signals from the other users.

In some other embodiments, the computer system for evaluating media content also includes a media content assessor configured to assess the media content at least partially based on the analysis result of the media content analyzer and an objective function received from the input interface.

In some other embodiments, the media content assessor is further configured to automatically decide whether the media content is to be optimized then presented to the users in the online community again for evaluation.

In some other embodiments, the media content assessor is further configured to automatically decide whether the media content is to be optimized then presented to the users in the online community again for evaluation, based on transaction requests received for the media content.

In some other embodiments, the computer system for evaluating media content also includes an investment analyzer configured to recommend an investment strategy to an investor at least partially based on the analysis result of the media content analyzer and a risk profile of the investor.

In some other embodiments, the media content analyzer is configured to evaluate the media content at least partially based on profile information of the users in the online community.

In some other embodiments, the media content presenter is configured to control access of the users in the online community to the media content.

In some other embodiments, the computer system for evaluating media content also includes a media content transaction module configured to facilitate transactions of the media content.

In some other embodiments, the media content transaction module is configured to auction a right associated with the media content.

In some other embodiments, the right associated with the media content is one of (1) a right to own the media content; (2) a right to lease the media content for a period of time; (3) a right to advertise relating to the media content; (4) a right to develop a derivative media content relating to the media content; and (5) a right to influence development of a derivative media content relating to the media content.

In some other embodiments, the informative signals include at least a user behavior action and a user engagement action.

In some other embodiments, the user engagement action includes one of (1) expressing emotion; (2) voting; (3) defining quality associated with the media content; (4) predicting a future quantity associated with the media content; (5) characterizing the media content; and (6) associating a quantity of on-platform currency with the media content.

In some other embodiments, the computer system for evaluating media content also includes a social network interface configured to gather additional feedbacks relating to the media content, a media content analyzer trainer configured to train the media content analyzer, and an anti-manipulation module configured to prevent manipulation of the informative signals from the users.

In some other embodiments, the anti-manipulation module is configured to prevent manipulation of the informative signals from the users at least partially based on profile information of the users in the online community.

In some other embodiments, the input interface is an application programming interface (API).

Disclosed subject matter includes, in another aspect, a computerized method of evaluating media content, which includes receiving a media content for evaluation by users in an online community, presenting the media content to the users in the online community for evaluation, monitoring informative signals relating to the media content from the users in the online community, evaluating the media content based on the informative signals from the users and generating an analysis result relating to the media content, and determining an incentive to one of the users in the online community based on the informative signals from the one of the users.

In some embodiments, the computerized method for evaluating media content also includes determining the incentive to the one of the users in the online community at least partially based on the analysis result of the media content analyzer.

In some other embodiments, the computerized method for evaluating media content also includes determining the incentive to the one of the users in the online community at least partially based on one of (1) informative signals from other users in the online community, (2) weight assigned to the informative signals from the one of the users by the media content analyzer in evaluating the media content, (3) correlation between the informative signals from the one of the users and a gold standard action associated with the media content, (4) time of the informative signals from the one of the users relative to time of the informative signals from the other users, (5) matching of the informative signals from the one of the users with the informative signals from the other users, (6) quality of the informative signals from the one of the users, and (7) ranking of the informative signals from the one of the users among the informative signals from the other users.

In some other embodiments, the computerized method for evaluating media content also includes assessing the media content at least partially based on the analysis result of the media content analyzer and an objective function received from the input interface.

In some other embodiments, the computerized method for evaluating media content also includes automatically deciding whether the media content is to be optimized then presented to the users in the online community again for evaluation.

In some other embodiments, the computerized method for evaluating media content also includes automatically deciding whether the media content is to be optimized then presented to the users in the online community again for evaluation, based on transaction requests received for the media content.

In some other embodiments, the computerized method for evaluating media content also includes recommending an investment strategy to an investor at least partially based on the analysis result of the media content analyzer and a risk profile of the investor.

In some other embodiments, the computerized method for evaluating media content also includes evaluating the media content at least partially based on profile information of the users in the online community.

In some other embodiments, the computerized method for evaluating media content also includes controlling access of the users in the online community to the media content.

In some other embodiments, the computerized method for evaluating media content also includes facilitating transactions of the media content.

In some other embodiments, the computerized method for evaluating media content also includes auctioning a right associated with the media content.

In some other embodiments, the right associated with the media content is one of (1) a right to own the media content; (2) a right to lease the media content for a period of time; (3) a right to advertise relating to the media content; (4) a right to develop a derivative media content relating to the media content; and (5) a right to influence development of a derivative media content relating to the media content.

In some other embodiments, the informative signals include at least a user behavior action and a user engagement action.

In some other embodiments, the user engagement action includes one of (1) expressing emotion; (2) voting; (3) defining quality associated with the media content; (4) predicting a future quantity associated with the media content; (5) characterizing the media content; and (6) associating a quantity of on-platform currency with the media content.

In some other embodiments, the computerized method for evaluating media content also includes gathering additional feedbacks relating to the media content, training the media content analyzer, and preventing manipulation of the informative signals from the users.

In some other embodiments, the computerized method for evaluating media content also includes preventing manipulation of the informative signals from the users at least partially based on profile information of the users in the online community.

Disclosed subject matter includes, in yet another aspect, a non-transitory computer readable medium having executable instructions operable to, when executed by a computer, cause the computer to: receive a media content for evaluation by users in an online community, present the media content to the users in the online community for evaluation, monitor informative signals relating to the media content from the users in the online community, evaluate the media content at least partially based on the informative signals from the users and generating an analysis result relating to the media content, and determine an incentive to one of the users in the online community at least partially based on the informative signals from the one of the users.

Various embodiments of the subject matter disclosed herein can provide one or more of the following capabilities/features. Media content can be tested, optimized and evaluated based on user responses to the contents on a social media platform, including user behavior such as views, user responses such as comments, and user actions such as votes or other expressions of user opinion. The social media platform can be designed for the express purpose of eliciting informative signals in regard to media content through user behavior and actions. Information can also be incorporated from other sources, including micro-blogs, social networks and news sites. Continual measurement and refinement of media content can be supported, with production of variations on contents made in a way that is responsive to feedback. Methods of statistical machine learning and regression can be used to estimate the value of media content, and provide probabilistic models of value. Value estimates can be used to guide investment decisions and franchise extension decisions, enabling return-on-investment from media content over the whole range of demand. In this way, the user community can be involved in choosing which new content is produced, participating in a democratic process of refining content and promoting content. Behavioral metrics in regard to the affinity of users for media content can also be inferred from data, and used to better understand consumer decision making and in order to improve marketing and distribution. User feedback on original content provided by third parties can be obtained, allowing an exchange for content, where new content is deployed on the supply side, evaluated by the community, and ultimately matched with potential investors on the demand side.

These and other capabilities of embodiments of the disclosed subject matter will be more fully understood after a review of the following figures, detailed description, and claims.

BRIEF DESCRIPTION OF THE DRAWINGS

The accompanying drawings, which are incorporated into and constitute a part of this specification, illustrate one or more embodiments of the disclosed subject matter, and together with the detailed description, serve to explain the principles and implementations of the disclosed subject matter. In the drawings.

FIG. 3 illustrates an exemplary user interface for uploading content to a platform, according to some embodiments of the disclosed subject matter.

FIG. 6 illustrates an exemplary user engagement panel with a high level view of different user actions for different content (C1-C6) along with platform feedback, according to some embodiments of the disclosed subject matter.

FIG. 7 illustrates an exemplary user interface for spending the points (digital dollars) collected from participation on the platform, according to some embodiments of the disclosed subject matter.

DESCRIPTION

Figure 1:
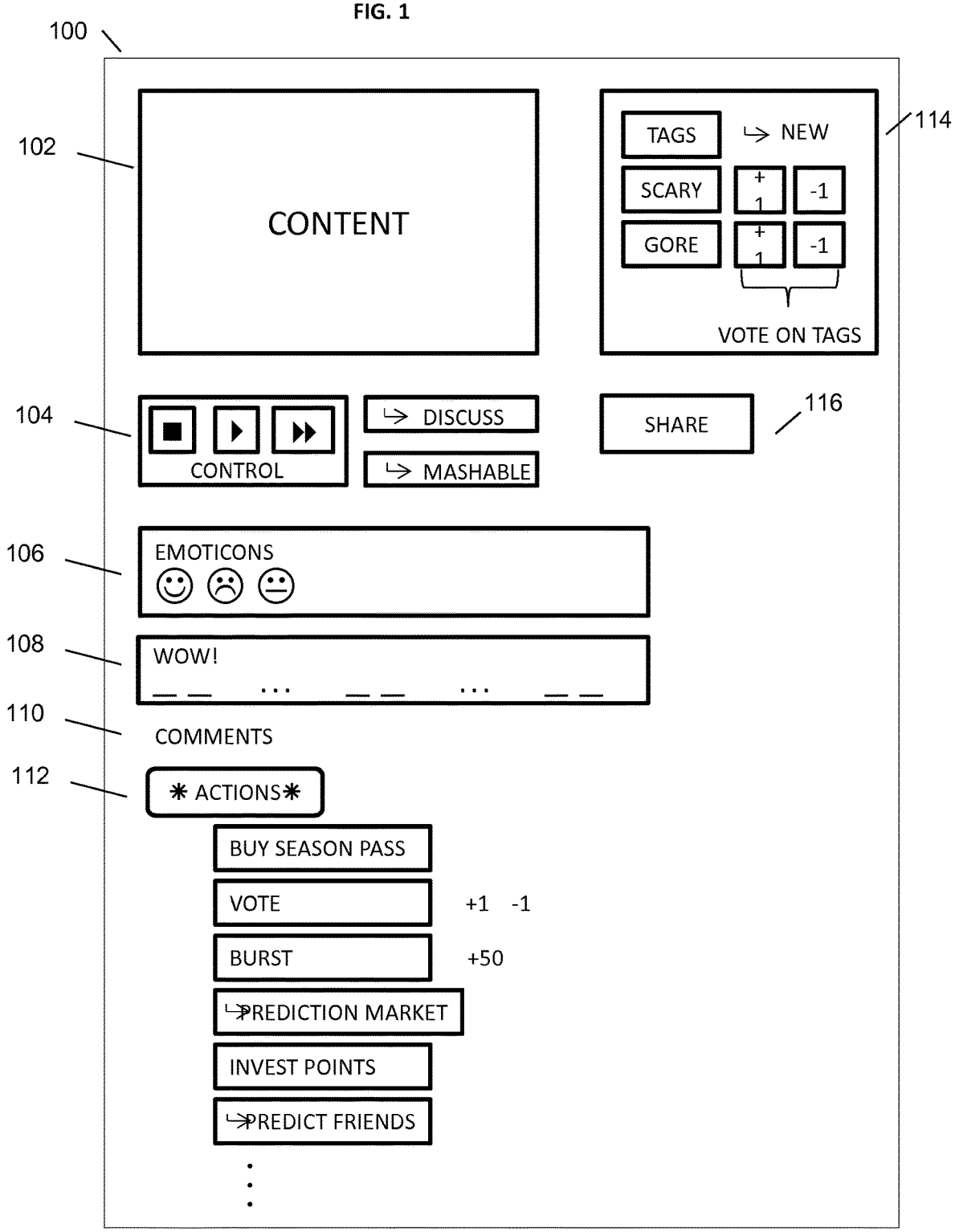
FIG. 1 illustrates an exemplary user interface in regard to a single media content along with available user actions, according to some embodiments of the disclosed subject matter.

The digital revolution is having a dramatic effect on the economics of media content. These new economics make it important to identify and value contents all the way along the demand curve, from mainstream through to the so-called "long tail" of content. The economics of the broadcast and movie theater era required hits in order to attract large audiences and justify the large fixed costs of production. But today the hits compete with a multiplicity of niche markets. The tools of production have been democratized, increasing the amount and diversity of new media content, and putting stress on traditional methods by which new media content are evaluated.

The new low-cost tools of production can also facilitate a very rapid cycle of develop-test-refine and test again. What is missing is a way to rapidly and accurately test new media content, enabling this "back casting" rather than "forecasting" to be leveraged in deciding on how to continue to invest in media content. For the first time, these tools of production make it possible to refine media content quickly. The subject matter disclosed herein recognizes that this is especially powerful if it can be combined with continual feedback and guidance from an engaged user community.

For decades all content was consumed passively. Today, users want to interact with content, but users also demand that content be curated and developed in a way that is personalized to their particular tastes. Users want to watch content seamlessly across devices and across space and time, want to influence the decisions in reality shows such as "American Idol," and go online and play social games with people around the world. Consumers are shifting from traditional media to digital media, from mass to individual consumption, and towards mobile platforms. Looking forward, mobile devices will continue to evolve into a popular medium for consumers to access entertainment.

There is also a rapid rise in online viewing habits for TV shows, user generated videos and "webisodic" programming. This rise in webisodic programming—short format content rolled out at a regular frequency (e.g., daily or more frequent still) finds synergies with platforms that seek to engage users with content, such as the platforms that provide possible embodiments of the disclosed subject matter, by ensuring repeat visits and continued attention.

This new participatory culture, with active consumers promotes entertainment franchises that extend across multiple platforms, collectively expanding the storytelling experience, and raising expectations of a more free flow of ideas and content. New consumers are active, migratory, more socially connected, noisy and public. Consumers also bond together, to form virtual communities around their mutual intellectual and entertainment interests. Social media platforms serve as sites for collective discussion, and also for the development of new ideas. Fans are drawn to the collaborative production and evaluation of knowledge, restoring democratic citizenship—such as on Wikipedia.

Marketers are seeking to shape brand reputations not through an individual transaction but through the sum total of interactions with a consumer; this is an ongoing process that increasingly occurs across a range of different media touch points. Marketers are interested in audience "expressions", trying to understand how and why audiences react to content, and in measuring attentiveness to programming, and degree of loyalty and affinity with content and sponsors. Consumers not only watch media they also share it with each other; whether by wearing a T-shirt proclaiming their passion for a product, posting a message on a discussion list recommending a product to a friend, or creating a parody of a commercial that circulates on the Web.

The problem of predicting the value of media content is widely accepted as a notoriously difficult problem. Consider for example the problem of predicting "hit" movies—this problem is especially difficult because of the power-law distributions that characterize movie revenue, where there are a number of movies that generate a significant amount of revenue, more than would be expected by the typical exponential tail distributions such familiar from the Gaussian distribution. An important consequence of power law distributions is that simple predictors based on sample averages of similar movies produced in the past are poor estimators. Being able to identify these "hits" is important in achieving high return-on-investment. An especially difficult problem is to make a prediction based purely on pre-release information, that is based on information available before a movie is first released in the box office. This is considered to be an important task for distributors and exhibitors, who have to determine the number of movie screens, for example, and related promotional activities. Each film is unique and the demand for any given film is difficult to predict. Generally speaking, media content are unique in being intangible and experiential in nature. Even when a film uses the same actors, is of the same genre, or is a sequel or a new version of a previously released film, there is still considerable uncertainty as to whether or not it will be successful. Part of the problem is a word-of-mouth feedback dynamic, where information about a movie propagates through a population, leading to a "rich get richer" dynamic, path dependence, and non-linearity. Studies can confirm that weekly revenues are auto-correlated: more recent revenue increase is more likely to experience additional revenue growth. Black swan theory refers to high impact, hard to predict, and rare events beyond the realm of normal expectations. The subject matter disclosed herein can allow investment to scale in response to predictions in regard to value of media content made on the basis of measurable user behavior Continuing with movies as an exemplar of media content, the basic economics of the movie business is: most movies are unprofitable, more than 75% lose money, and around half of these account for 80% of total losses, while some 6% of films earned 80% of Hollywood's total profit over the past decade. In 2006 the average movie cost US $60M and with US $40M more in marketing and these huge up-front costs coupled with the unpredictability of box office revenue brings high risk. Making a good prediction of the first week's revenue is especially important, given that 25% of box office revenue comes from the first 2 weeks. Recent years has also brought a trend towards obtaining outside financing, with private equity, hedge funds and other institutions seeking return on investment (ROI). Movie producers and studios are increasingly looking to bundle contents and securitize them, reducing risk and gaining leverage in order to develop a wider portfolio of movies. Movie content can also extend into other channels (e.g., pay-per-view, cable, broadcast TV, web, mobile, etc.) and be licensed, used for merchandising, TV shows, books, plays, theme park attractions and games. Whereas Hollywood used to be able to build robustness to flops by doing big releases and a large media spend—hoping for bandwagon effects and inefficient information cascades, this is much more difficult today because of more efficient word-of-mouth dynamics amongst consumers. This is in turn placing new stress on the need to predict demand and value of media content before the investment of resources, scaling supply in order to optimize profitability. Rick Sands, the COO of Miramax summarizes this as "In the old days . . . you could buy your gross for the weekend and overcome bad word of mouth, because it took time to filter out into the general audience. Those days are over. Today, there is no fooling the public."

In effect, moviegoers are becoming more informed, and thus more rational in their consumption decisions. Rather than just responding to raw numbers in regard to "number of screens" and "number of people" going to see a movie, the easy ability to share rich information over social networks and micro-blogs protects against incorrect inferences in regard to a new movie being good. Twenty years ago the average film dropped less than 30% in box office revenue from its first to its second weekend while today the average is more than 50%. Bad films are ousted even before they are released, thanks to web sites like "Rotten Tomatoes" and "Ain't It Cool News."

The typical attitude in Hollywood to movie revenue prediction can still be summarized with the following quote from Jack Valenti, then president and CEO of the Motion Picture Association of America "No one can tell you how a movie is going to do in the marketplace. Not until the film opens in darkened theatre and sparks fly up between the screen and the audience."

In the case of movies, typical pre-release features that are included in statistical regression models of box office revenue include:

MPAA rating, the presence of competition from movies of a similar genre, star value of actors ("marquee value"), movie genre, the presence of technical effects, whether the movie is a sequel, where there is any sexual content special effects, average professional critic reviews, Academy Awards or nominations for members of cast, whether any member of the cast or the director was in one of the top-ten grossing movies in the previous year, the release date, advertising budget, movie budget, presence of major distributors, seasonality and holiday period considerations, number of screens, and professional critic reviews.

Post release data: time sequence of revenue in the previous week (or weekend).

Given such data, machine learning and statistical regression approaches can seek to predict box office revenue. Many of the models find that the number of screens can be very informative, which is unsurprising given that it conveys a lot of information from studios and distributors about how they think a movie will perform.

In some models, there are two consumer decisions: a first decision in regard to "time to decide" and a second decision in regard to "time to act" (conditioned on a decision being made to watch the movie.) From this, the authors obtain a generalized Gamma distribution that can be used to predict revenue dynamics in regard to both "sleeper style" and "blockbuster style" movies. Improvement in predictive accuracy has also been obtained through careful modeling of the effect of competition between movies in the box office. The prediction task can also be set-up as one of classification rather than regression, seeking to place box office revenue into a category. Other studies have considered the predictive power of US box office numbers on foreign box office numbers, developing a model of "cultural distance" to the US.

The role of reviews by professional critics can be studied, with the consensus that professional critics tend to act more as "influencers" than "predictors." Richer data has also been introduced from critical reviews, with textual features shown to improve accuracy. Efforts can be made to use natural language processing (NLP) technology to forecast the return on investment (ROI) of a movie based on the script. A bootstrap-aggregated classification and regression tree (CART) model was used to select a slate with positive ROI, but the comparison was considerably simpler than that in practice, to select a slate from a list of movies that had been produced, rather than a slate from the many tens of thousands of screen plays that are generated.

Technical approaches can often adopt linear regression but can also consider probabilistic models (including EM for training and MCMC for inference), support vector machines, logistic regression, non-parametric approaches such as k-nearest neighbors, and neural networks amongst others.

Decision support systems to aid movie theaters make decisions in regard to which movies to schedule and on how many screens. A simple two or three parameter decay model of revenue, with parameters predicted based on typical meta-data in regard to movies, is coupled with a machine-scheduling mathematical programming formulation of the associated optimization problem. The focus is on decision support in regard to how to schedule movies that have been produced, not on the process of deciding in which contents to invest in the first place.

Although statistical machine learning can be applied to predict the value of media content, notably movies, it has not been especially successful. A typical reported accuracy using only pre-release data is around 50-70% mean absolute predictive error, likely too inaccurate to bring significant value to the movie industry. Moreover, the predictions are made on metrics such as budget and advertising spend that are incurred after a decision has been made to "green light" a script.

Online data can be leveraged, such as sentiment analysis of news articles, word-of-mouth and information from micro-blogs and other social platforms, with the objective of gaining more accurate forecasts. Discussion threads on IMDb can also be predictive in regard to box office success, especially the "intensity" (the frequency of the subject in discussion) but also the "positivity" (the degree of positive feelings towards a movie expressed by contributors) of discussion. Analysis can be conducted to understand the centrality of different posters and also the positivity of discussion. The volume and sentiment of tweets and the number of views, number of comments, number of favorites, number of likes, number of dislikes, fraction of likes over dislikes on a YouTube trailer, can be used in linear regression to predict the IMDb ratings for movies. The sentiment from Twitter can provide considerable additional predictive power over and above the quantitative YouTube data.

Systems can be developed to monitor and exploit for the purpose of prediction the user data generated on the Twitter platform. For example, Twitter sentiment can be used to predict public opinion around elections; Twitter can be used to predict the box-office success of movies, via sentiment clues or simply the rate of tweets. A model based on the rate of tweets can be more predictive than traditional approaches, although they do couple the rate of tweets with the number of screens a movie opens. Adding sentiment signals in tweets, with the model trained on the basis of labeled data, generated additional predictive power. Technology for the effective processing of "big data" can also be within grasp. But these systems are not coupled with methods to perform prediction in regard to the value of media content.

Some platforms can use measurement of online consumer behavior for the purpose of informing companies about brand, user traffic at web sites, and marketing effectiveness, including pre-testing of creative, and providing analysis as to the types of users visiting different web properties (including demographics and affinities with other sites and with interest areas). These platforms, however, do not incentivize user behavior or user actions on a social media platform that can be used for the controlled measurement, testing and refinement of content.

Some prediction markets can improve predictive accuracy over approaches that are limited to just meta-data in regard to movies such as genre, number of screens, budget and so forth. Prediction markets have been found to have reasonable robustness to manipulation. In addition, the users may feel wary about information they are revealing for free, and to whom, and moreover that incentives to manipulate will increase once the data is used for consequential decision making—and that good mechanisms for filtering or controlling manipulation will be essential.

There exists today a large number of social media platforms, notably those for video sharing and streaming. But these systems do not accommodate the kinds of proprietary signals that can be generated through the express design of a social media platform for understanding user engagement with content, in order to provide estimates of the value of media content.

Prediction accuracy of existing systems remains relatively poor, and often relies on access to the number of screens on which a movie will open. There remains a significant limit to the accuracy of prediction that can be achieved through the data available from public traces of online activity. Additional concerns in regard to the use of online activity for prediction can include:

Unrepresentative data, with a heavy tail of user contributions and concerns in regard to credible vs. non-credible posts.

Subjectivity to manipulation by coalitions of users "trading shout outs" for each other to drive up centrality measures or otherwise employing spam and false-name accounts to boost their rank.

Low quality information in user profiles on micro-blogs and other social platforms.

Difficulty for accurate estimates of the demand or value in regard to the vast spectrum of media content, and certainly not in regard to early-stage media content that have not yet seen significant investment.

What is needed is a way to engage a user community on a social media platform that is expressly designed to elicit informative behavioral information and user actions in regard to making predictions about the value and demand for media content. What is needed is a way to control the flow of new media content to a community of users, these users engaged in generating behavior and user actions that are informative in regard to the value of a media content and informative in regard to user demand for a media content.

By controlling the access to, and flow, of media content it can help avoid (for the purpose of leveraging the critical resource of user attention) the heavy-tailed view distributions that occur on open web platforms such as YouTube, in which a few pieces of content gaining the vast share of views. In the context of a social media platform, expressly designed for the purpose of curating predictive metrics in regard to content, this can be wasteful.

At present one would need to run a "focus group" to evaluate or predict the properties of a new media content, or alternatively, make inference based on media content with similar creative properties (e.g., in regard to genre, actors, style, themes, motifs, etc.). In addition to being very costly, traditional market research and focus groups are also known to be subject to biases. Traditional focus groups are also unsuitable for the evaluation of media content because of the high degree of heterogeneity in user appreciation of media content, and the need to make predictions in regard to media content all the way along the demand curve from the "hits" to the niche demands on the tail.

A suitable solution should motivate the user community, for example through rewards or through providing a democratic process by which decisions are made. It can also be useful to provide robustness against manipulation for example by insisting on strong user identities and other protections against so-called "Sybil" or false-name attacks. The interests of participants in the community can be aligned with providing truthful expressions of their preference over content in order to allow for predictive measurements.

Existing social media platforms are not designed for the express purpose of generating predictive signals, for example by incentivizing and rewarding user actions. Nor are they designed to promote optimized investment decisions in new content, with investment scaled to match demand, or to support the continual testing and refinement of content. Nor is it easy today to identify exciting new user-generated content for the purpose of refinement and investment, or provide data to guide negotiation between producers and distributors, or other parties, in regard to media content. There exists at present a need to assign a value to a prospective media content such as a web series, TV show, or film before investment is made in further development of the content. A suitable solution should enable a value to be assigned so that investment can be made at the right scale, or content produced in the right format, or marketed to the right consumers, or distributed on the right platforms.

Auctions can be used for pricing ads that appear next to search results or content online, both display and textual ads, with advertisers submitting real-time or standing bids for user attention and configuring these bids to depend on such factors as:

Demographic
Content/search string
Information about recent user behavior as reflected in cookies
Frequency limits for a user
Budget constraints
User affiliations (e.g., Likes)
Time of day
Location
User device One mode for the auction platform (e.g., a search engine) can be to build a predictive model of whether or not a user will click on an ad. Given this, the advertiser can bid "per click" and the auction can sell "impressions", factoring the estimated clickthrough rate in order to interpret a per click bid as a per impression bid.

Auctions can also be used for the allocation of advertising space in radio, TV and newspaper. This can include the proposed use of auctions for "up-front" markets where TV networks sell advertising inventory ahead of a new season. Auctions can also be used for the sale of financial instruments, including the sale of debt and tax liens and can be used by governments for the sale of public contents such as wireless spectrum and within the supply chain by firms; e.g., for the procurement of direct and indirect supplies.

By engaging a user base in taking actions on a social media platform that are predictive, the behavioral and user-generated data can be leveraged for statistical machine learning and prediction in regard to the value of media content.

Media content can include entertainment media content, such as Films, TV shows, commercials, Music, Video Games, Web Series, Spectacle, Print, Apparel and Merchandise. These contents can be tested and refined for the purpose of improving the understanding of contents, and for facilitating decisions in regard to scalable investment, enabling better informed investment decisions. Users can express preferences over content and be part of the process of deciding which new content is produced or rewarded. Users on the platform are engaged in a participatory, democratic process, their actions generating data on the basis of which ongoing decisions are made in regard to contents.

The method and system disclosed herein can act as a kind of clearing house or exchange for media content, where contents can be deployed on a social media platform, evaluated through user behavior and action metrics, and then matched with potential investors or distributors. By giving consumers a stake in the success and survival of a content franchise, ensuring that the content more fully reflects their tastes and interests, media producers can mobilize these active and committed consumers.

The content engaged with the platform can take the form of a high quality, low cost test format, if the content is yet to be produced in full. Test formats of contents can include such formats as beats, scenes, acts, trailers, pilots, commercials, episodes, shorts, songs, chapters, or levels (in a video game). For example, the content engaged with the platform could be a trailer, for example in the case that a movie has been produced and there is a need to estimate expected demand for the movie, so better decisions can be made relating to marketing and distribution. Alternatively, the content may represent content that is in one format (such as a book), with the goal to use the platform to measure user engagement and thus assess demand for the content if extended through investment to some other format such as webisodes, TV show, or a movie.

By allowing for the rapid testing of media content, the system and method disclosed herein allows for a new paradigm in which media content are refined in a produce-test-refine loop, on the basis of quantified feedback from the community. The new costs of production enabled by digital technology afford for incremental investment in media content, in order to best match with what is learned about demand for, and thus value of, the content.

Content owners can benefit from being able to deploy media content to the platform in order to receive predictive data in regard to the value of the content. A platform that embodies the disclosed subject matter can also serve a role in promoting a viral word-of-mouth buzz in regard to new content, in this way also driving media attention prior to theatrical release.

Participants in the community can benefit from being able to participate in the democratic process of deciding which contents receive continued investment and development and also through direct incentives through prizes, discounts and access, including obtaining the right to upload content for evaluation on the social media platform. Investors can benefit through being able to make more informed decisions as to which media content to finance, and to what scale. Content creators can benefit from access to funding and distribution, including the ability to establish the value of their media content. As such, the subject matters disclosed herein can bring together content owners, content generators, consumers, content distributors, and investors, enabling a new kind of content exchange.

By generating informative metrics in regard to contents, the embodiments of the disclosed subject matter can serve to filter and refine a constant stream of new content, this content being democratically "green lit" by the feedback and behavioral metrics generated by an engaged user community. The platform can be used to predict the potential revenue and other relevant metrics (for example number of views, or franchising opportunities) of new media content, both on platform and off platform, including in theatrical release, or on digital platforms such as Amazon Prime or Netflix.

The disclosed subject matter can harness the active and participatory consumer culture that presents a challenge to traditional media, harnessing it here for the purpose of enabling financers, producers, and distributors of traditional media to decide in which content to make investments and at what scale. In this way, the social media platform enabled by the disclosed subject matter can provide robustness to flops and allows for hits to be identified and then exploited, including making return on investment across the demand curve, building robustness to negative black swans by enabling adaptive and responsive investment. Behavioral and user metrics from the platform can provide the input to statistical analysis and machine learning tools, in order to enable a more scientific approach to media investment.

Just as there may be a big difference in the predictability of box office revenue before an opening weekend to after an opening weekend, the approach of backcasting in some embodiments can seek to collect user behavioral metrics and data in regard to user actions on a social media platform (e.g., numbers of views, numbers of likes, numbers of recommendations to friends, diffusion over a network, and so forth) in order to measure the success of a media content and then predicting on the basis of that measurement the likely success of subsequent development or variation on the content. To understand the efficacy of this approach consider, for example, that the success of sequels of successful movies is much easier to predict than the success of a new movie. With backcasting, content can be tested, refined and continually developed on the basis of actionable feedback from a community of users. One of the advantages of backcasting over forecasting is that content producers and investors would be freed from making big bets on a small amount of information, only to discover that the demand is not what was expected.

The generated metrics can provide value to various parties in gaining leverage for the purpose of negotiating with strategic partners (e.g., conglomerate, studio, production company, distributor, network, foreign sales company, entertainment portal, search engine, sponsor, manufacturer, game publisher, etc.). In addition, the system could be used to reduce or eliminate information asymmetry through the credible and trustworthy sharing of metrics derived from the behavior of members of the community, which can help, for example in boosting revenue in the auction of a content through the linkage principle of auction theory.

In addition, the information generated from the platform can be used to generate risk-return profiles for different contents, enabling financial instruments such as derivatives to be generated and priced for the purpose of risk sharing, securitization, and gaining access to new investment streams.

Content that is highly rated by the user community can be professionally produced, coupled with investment, and distributed on a sister site that is used for the distribution of professional, featured content. High quality, original content can also be made available on the social media platform in order to mobilize a user base of highly committed, active and loyal consumers, and keep them entertained, intellectually stimulated and emotionally engaged.

Strong synergies exist with the new technologies of production, notably digital technology, that enable rapid experimentation, coupled with early and continued feedback. In addition, an embodiment of the disclosed subject matter can provide users with social media tools, designed to enable users to create their own content, in order to express their unique creative visions and share them with the community. Independent content producers can benefit in this way, through the existence of an active, involved social media community, in helping to identify good ideas.

In addition, the disclosed subject matter can provide the ability to filter user generated content, in order to identify new content for the purpose of investment.

Once predictions are available about the quantity of views that media content will receive from different user demographics and in different formats, these predictions can be shared with advertisers in order to enable informed bidding for the right to advertise (or an option on advertising) alongside new content, in the event that it is produced. In this way, the auction determines the value of the content to advertisers. This information can be further used for additional auctions—for example, allowing producers or financers to bid for the right to produce or finance content, with knowledge of the bids placed by advertisers for prospective content. These bids could be rolled into a single auction as would from the methods of combinatorial auctions.

In this way, the use of "backcasting," where data can be collected on content and used to predict the success of additional, related contents should it be produced, finds a good synergy with the use of electronic auctions. The platform provides credible information (through its predictive models) to guide the bidding of advertisers, and in turn to guide competition between producers for the right to produce content. The disclosed subject matter can provide predictive metrics that guide the value of the bundle of rights associated with media content (e.g., the opportunity to reach all of the people who view the content in the future.)

In evaluating and investing in media content, existing systems lack predictability and methods to support the rapid testing and refinement of media content. According to embodiments of the disclosed subject matter, media content, perhaps as test formats, can be released to a community of users on a social media platform, the behavioral metrics and explicit user actions associated with these users can contribute to the ability to:

predict the value of contents, including the ability to generate probabilistic information to reflect uncertainty in an estimate and including predictions for franchise extensions and other variations on a content, and use these predictions to decide on investments in contents, and refinements to contents, for the purpose of continually identifying, refining and selecting media and investing at the right scale to maximize return-on-investment.

Rather than solely relying on similarity to other contents (for example, in terms of genre, actors, director, producer, themes, motifs, etc.), or evaluation by an expert or group of experts, the embodiments of the disclosed subject matter allow a media content to be evaluated by engaging a user base with the content, collecting metrics in regard to user behavior, actions, and engagement with the content, and then using statistical machine learning or other predictive approaches to estimate the value of the content, and promote decision making into further refinement and testing and also in regard to investment in the content, optimization of the content, and possible franchise extensions.

Figure 2:
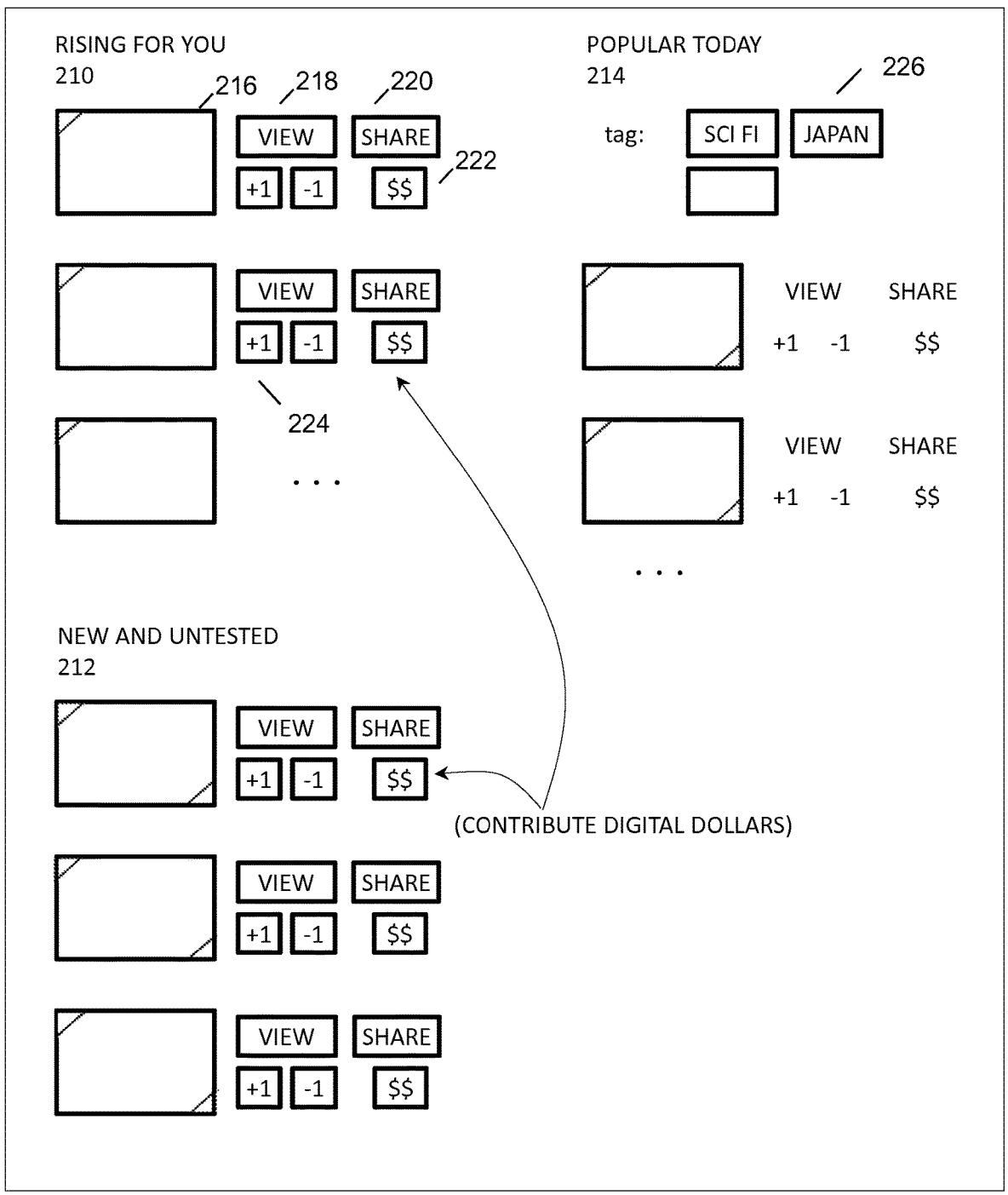
FIG. 2 illustrates an exemplary user interface in regard to different media content on a platform, according to some embodiments of the disclosed subject matter.

According to one embodiment, the functionality of the social media platform can include at least one of the following aspects as at least partially illustrated in FIGS. 1-3:

A landing page with user sign in (user name, password)

Filtering content by duration, genre, user-entered tags, date of upload, view count, length, category, trending, popularity, rating by community, rating by friends, and recency.

Voting tags up/down, for combination with a thresholding scheme for the validity of tags.

Ranking contents by some balance of popularity and recency, enabling continued exploitation and exploration by the user base.

Viewing content that is rising and targeted to a user, content that is popular today filtered by tags, and content that is new and untested by the community.

Creating "mashable content" and reusing/editing content to create second-order imitations or parodies, including tools to edit and manipulate content Discussing content, for example through micro-blogging functionality, web blogs or messaging.

Voting "like" or "dis-like" on content; hot/not.

Commenting on a specific part of a media content (such as a video), tagging which part the user likes or dislikes, and adding "emoticons" to the stream of content.

Commenting on a particular segment that elicited an emotional response, giving context about their opinion.

Sharing and diffusing diffuse content and feedback both on the social media platform and off the platform, following other users, and seeing who is following them.

Providing peer-filtered search recommendations (e.g., ranking content that is liked by a user's friends).

Supporting Flash, HTML5 and other media playback standards, including high definition video standards and cloud streaming.

Supporting basic video functionality, including upload and playback (where upload may be restricted to control the flow of new content to users).

Uploading contents by users, including tags, meta-data, the ability to down scope to a particular audience niche and instruction to the system as to platform goal.

Supporting digital fingerprints to ensure that only licensed, copyrighted content is uploaded to the social media platform.

Providing brand contents that can be embedded in video streams, allowing a user to purchase a product related to media content Offering critiques of the work of others (perhaps restricted to users with verified credentials as part of an art community, such as film school students)

Receiving feedback as to which content is gaining social actions, and in regard to the probability that content will be selected for incremental investment.

Aggregating contents from other platforms, including pulling content into a user's view based on content on other platforms that is popular (including weighting in favor of users with similar interests, similar friends, and so forth.)

Adopting emotions through emoticons or other means to share real time emotions in regard to content (e.g., happy, sad, scared, anxious, astonished, suspense, etc.)

Integrating with social networks and micro-blogging sites to allow users to, for example,
  sign into the platform using existing social network logins and identities,
  import friends into the platform,
  share their social graph and other basic demographic information (name, gender, other public information), enabling the discovery of friends from social networks on the social media platform
  allow comments posted by users to flow back to other social networks In one embodiment, a platform can allow a user to describe different goals for each piece of content, for example, "max exposure" or "selective test" or "investment" or "quick measure" (e.g., as illustrated in FIG. 3). FIG. 3 illustrates an exemplary user interface 300 for uploading content to a platform, according to some embodiments of the disclosed subject matter. The user interface 300 can show credit balance 310, file description 320, tags 330, meta-data 340, test audiences 350, and platform goals 360. The effect would be on the users matched with the content and the level of accuracy required (such that the test continues while insufficient data has been obtained or until ascertained that the content does not have the reach capability to sufficient reduce the variance on the prediction.)

In addition, uploaded content can in one variation be associated with a "decision type." For example, the decision type could be: develop and release to theater or TV network, develop and release to digital platform (Amazon Plus, Netflix or iTunes) release to another media type (e.g., book to video game), incremental investment of a second test format, develop to a webseries, and so forth. By providing this additional context then the platform can have information in order to decide adaptively how to assign users to content and how to assess whether or not enough data has been aggregated for the purpose of supporting a decision of the appropriate format, platform and scale. This can provide a richer user interaction when the platform is used as a decision support tool.

Figure 4:
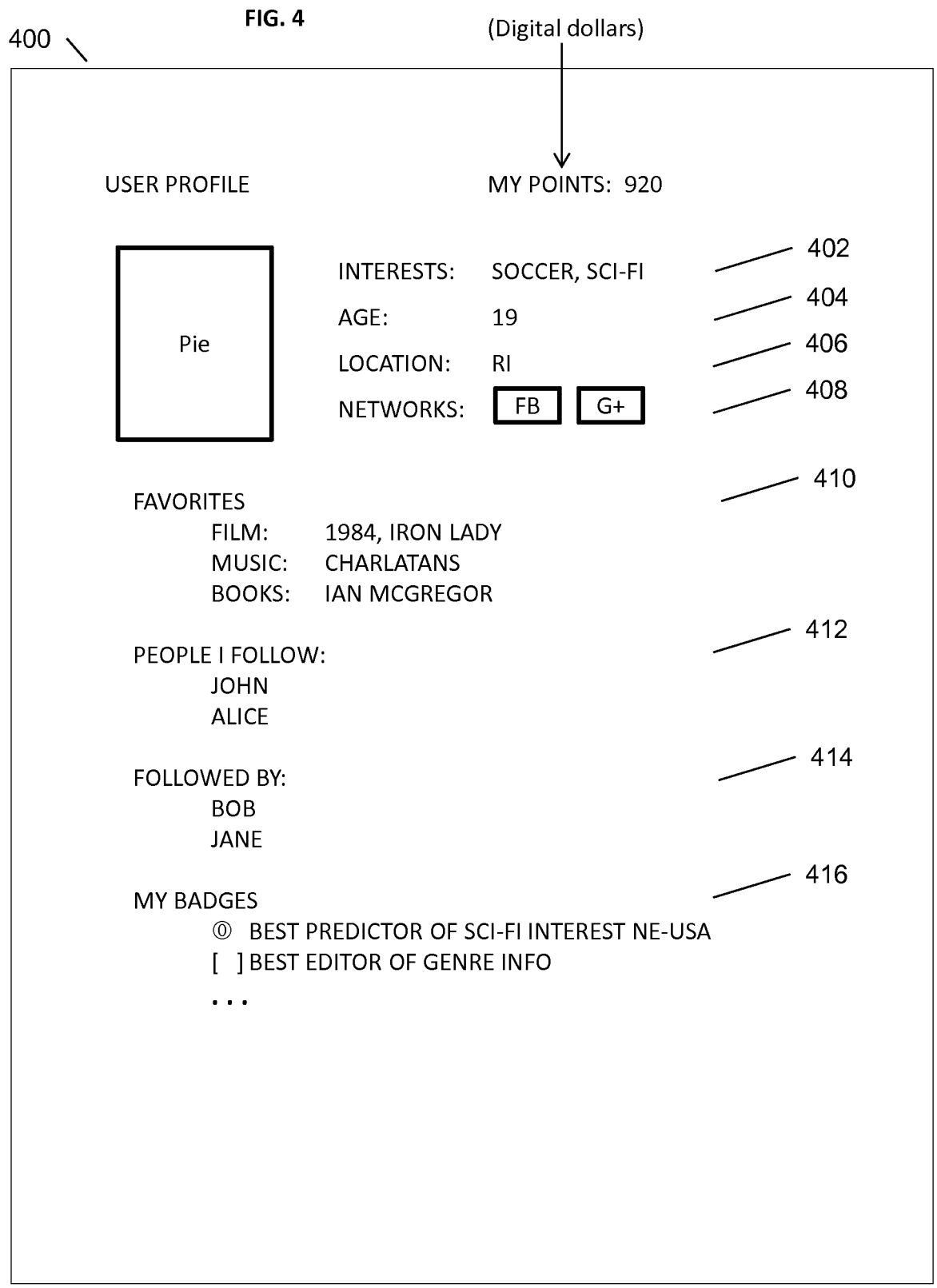
FIG. 4 illustrates an exemplary user profile, according to some embodiments of the disclosed subject matter.

In one embodiment, as illustrated in FIG. 4, users can create a user profile 400, including such information as gender, interests 402, age 404, location 406, school, networks 408, favorites 410, people I follow 412, followed by 414, my badges 416, occupation, friends, interests and hobbies, entertainment tastes and interests, photograph, featured videos, and also the ability to share a user's professional skills, or whether (and what kind) of job a user is seeking Entertainment tastes and interests can include
  favorite films (and recently watched)
  favorite TV shows (and recently watched)
  favorite music (and listening to)
  favorite video games (and playing now)
  favorite concerts (and recently attended)

favorite plays (and recently attended)

favorite books (and recently read)

favorite studios favorite artists, including producers, directors, actors, musicians, writers, painters, sculptors and fashion designers the social platforms and media platforms a user belongs to.

Members of a community can contribute content. Other parties can contribute "white label" test formats for engagement with the community, these test formats representing, for example, ideas for movies, games, TV shows, web series, apps, music, or advertisements.

Embodiments of the disclosed subject matter can work across multiple devices, including through web browsers, as applications built on top of social network platforms, and to mobile and tablet devices.

Figure 5:
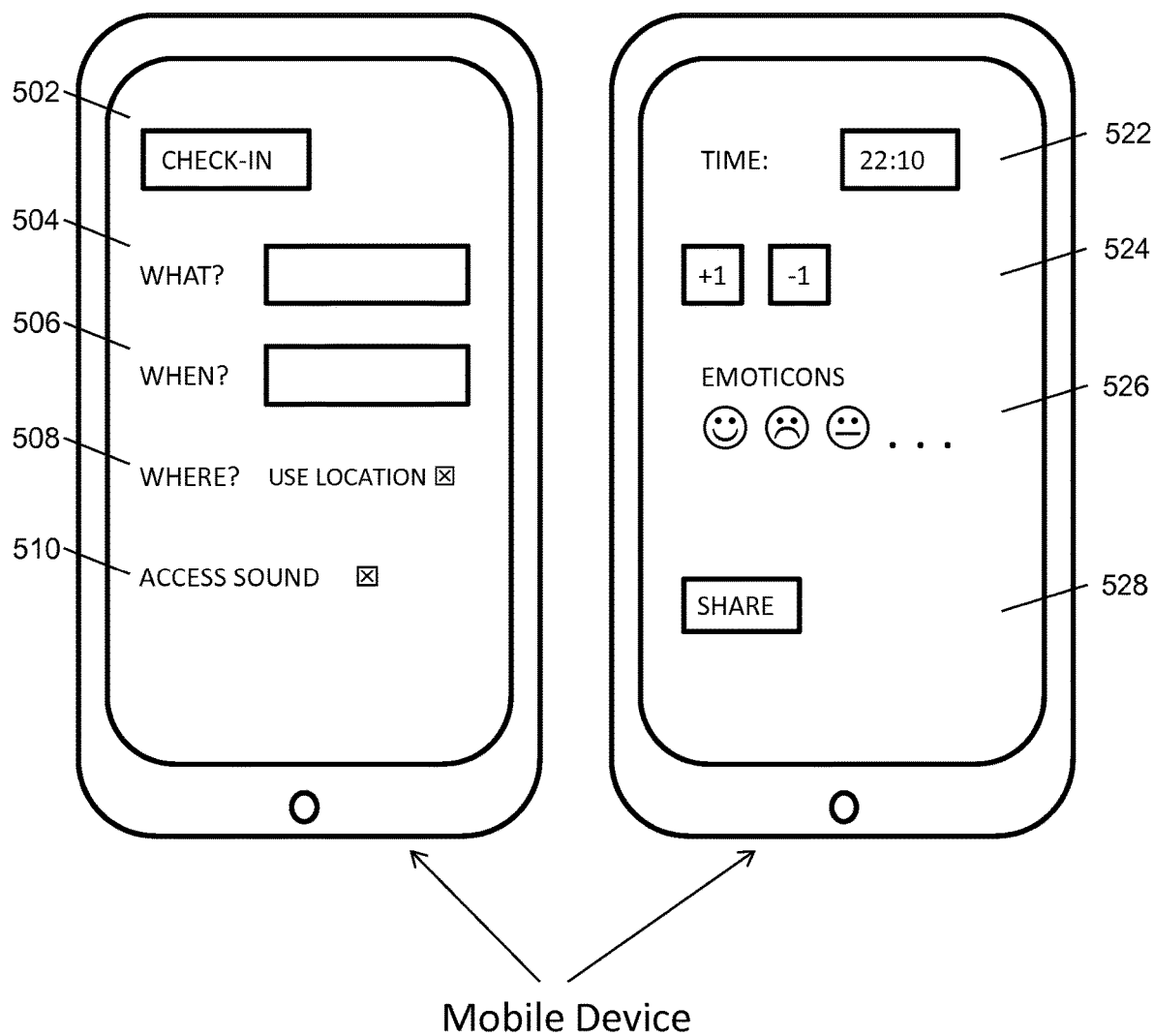
FIG. 5 illustrates an example of a user "check in to content" decision on a mobile device and a user view on a mobile device for providing feedback while experiencing the content, according to some embodiments of the disclosed subject matter.

A social media platform can facilitate the measurement and aggregation of at least the following aspects of user behavior and actions:

the media content purchased by a user, such as a webisode, webseries, song, film, TV show, app, album, or game, along with user context when making the purchase the branded content purchased by a user, along with information about user context when making the purchase (e.g., what video content was the user watching?)

the test formats of contents watched by a user, including whether the user watched a sequel to a test format the number of webisodes associated with a media content watched by a user, and whether the entire series was watched the sharing of content by users, including the diffusion of this content over the community on the social media platform the votes made by users and other user actions (e.g., gaming actions) on the platform the attentiveness of a user to content, including video content and adverts (e.g., rewind, forward, pausing, repeat views, making comments at various parts of the content, making expressions of emotion, and so forth)

the point at which users provided positive or negative feedback on content, both in terms of explicit actions (votes, or likes, dis-likes) and also through sentiment analysis performed on user comments the number of links to content to determine the influence of content the quantity, rate and sentiment in regard to discussion about a media content In one embodiment, as illustrated in FIG. 5, a user can "check in" to content similarly to how users can on social network platforms "check in" to locations. A user can specify the media content to be checked-in 504, a check-in time 506, a check-in location 508, whether to access sound 510, then click Check-In 502. When a user checks in a media content, the user can view the timestamp 522, give a plus/minus rating 524, express emoticons 526, and share the media content by clicking on Share button 528. A user can signal to the platform that he or she is watching a movie or a TV show or a play or engaged with some other media content, and then share user actions and feedback in regard to this content either directly on the platform or through another platform. For example, a user might send tweets or otherwise share information in regard to content but notify the platform, enabling this information to be collected. For example, this could be in regard to contents that represent second-order imitations of content on the platform. By notifying the platform, a user would earn points or otherwise be engaged with the user community while experience content off platform.

The cumulative data collected for each user can be combined, also, with "meta-data" in regard to content. For example, the meta-data can include the investment in a content, information about popularity or revenue from variations on the content (e.g., if a prequel or related content had a theatrical release the number of screens and amount spent on advertising), and information regarding the author, actor, director, genre, theme and so forth. Similar meta-data can be provided for other contents such as books, user-generated content, or video game levels.

Additional data that can be combined with the data in regard to user activity on the platform can include:

Information from professional reviews

Quantity of views, ratio of likes dislikes, rate of tweets, sentiment of tweets via natural language processing or otherwise.

Views of content on other social media and content platforms

Likes or "+1s" of content on other social media and social network platforms

Views of derivative media content (e.g., TV, theater, video games, etc.)

In addition, meta-data can be curated from the community in regard to the content and can include data pertaining to the story (as well as requested from content providers), for example in regard to the plot (e.g., completeness, unity, structure, irrationalities, reversal, complications etc.), the characters (e.g., personalities, emotions, social status, appropriateness, etc.), the creativity (e.g., medium, diction, style, technique, authentic, etc.), and transmedia qualities (e.g., negative capability, migratory cues, Barthesian codes, symbolism, etc.).

Embodiments of the disclosed subject matter can promote incentive alignment, so that members of the community remain engaged and provide informative feedback through user actions. For example, FIG. 6 illustrates an exemplary user engagement panel with a high level view of different user actions for different content (C1-C6) along with platform feedback, according to some embodiments of the disclosed subject matter. A user engagement panel 600 can display a list of media content 606. For each media content, the user engagement panel 600 can display a label (e.g., "Hot," "Rising," "Early," "Not," etc.) 602, a platform score 604, a vote checkbox 608, an invest points 610, a friend interest 612, and a revenue prediction 614. Although these features are sometimes described in the context of video content, it will be apparent that easy analogues are available for other content including digital books, video games, apps, and music. Some exemplary features can include:

Digital dollars, earned for various "social actions" and redeemable for merchandise, access to stars and so forth; e.g., digital dollars can be exchanged for a variety of incentives such as premiere tickets, concert tickets, merchandise, discounts, DVD's/CDs, direct downloads, etc. (e.g., as illustrated in FIG. 7).

Allowing users to assign (or "invest") digital dollars in contents, with commitment from the platform as to the rules that will be used in responding to user digital dollars, for example in guiding incremental investment in the content. As illustrated in FIG. 1, for example, an user interface 100 can present a media content 102, provide controls 104, list available emoticons 106 and expressions 108, provide comment field 110, and list available actions 112 (e.g., buy season pass, vote, burst, etc.); the user interface 100 can also present a voting pad 114 and a share button 116. FIG. 2 illustrates an exemplary user interface 200 in regard to different media content on a platform, according to some embodiments of the disclosed subject matter. The user interface 200 can show "rising for you" media content 210, "new and untested" media content 212, and "popular today" media content 214. For each media content, the user interface 200 can present the media content 216, a view button 218, a share button 220, a digital dollar amount 222, plus/minus buttons 224, and a tag 226.

Rewarding a user for providing an early recommendation for content that is ultimately liked by a lot of other users; the recommendation could be a simple "+1" or "Like" or a quantitative prediction (e.g., a range of popularity, or revenue, the user thinks the content can achieve.)

Restricting the number of "Like"s a user can cast to 10% of the videos viewed by a user (so that users don't just try to promote everything), and reward a user who is a "first-mover" based on the ultimate number of favorable views received on the content Leveraging contests to identify the best predictors amongst the user community; e.g., with prizes to users who are best predictors of whether content will become popular on the site, or whether a movie, if produced, will be a hit.

Eliciting user-relevant predictions from a user (e.g., how many of a user's friends will "like" or watch a video?).

Allowing users to cast votes on content, with payments made in the event that studios elect to produce content, or if incremental investment was made in the content, and when a user's vote was pivotal in influencing the decision. A vote is pivotal if it changes the decision. Limit the number of votes that a user can cast.

Allowing users to submit a "burst" vote to make a big difference on a piece of content but only once in a while (e.g., as illustrated in FIG. 1).

Rewarding a user for sharing videos with friends that watch and like a video, or watch and share with other friends.

Rewarding a user for an accurate prediction in regard to how many of the user's friends will ultimately pay to watch content if it receives incremental investment and is developed Providing users a limited number of votes to influence which content receives additional investment. Perhaps commit that some investment decisions will be tied explicitly to transparent and quantitative aggregates of user feedback, such as votes, keeping the community of users engaged in a democratic, participatory process.

Providing transparency to users in regard to their influence, including virtual awards ("barn stars"), leader boards, and other ways to provide social recognition. Allow users to assign "badges" to other users and allow the community to create badges around different types of content (e.g., as illustrated in FIGS. 4 and 7).

Asking users to predict which content will receive incremental funding and be selected by the community as popular content, with users rewarded with digital dollars for being correct, while losing digital dollars for being wrong Allowing users to bet (long and short) digital dollars on which media content they think will succeed or fail. Success can be quantified in different ways; e.g., number of views on day 1, number of views on day 7 given number of day 1 views, revenue in the event of more investment and a web series is produced, etc.

Employing a prediction market or other incentive-based methods for information elicitation (including the methods of peer prediction, where users are scored against information provided by other users), in order to reward users for contributing to accurate predictions. In the case of a prediction market, this is achieved by allowing users to buy or sell options whose ultimate value depends on something measurable in regard to the popularity, revenue, or number of views generated by a media content.

Adopting user surveys, rewarding users with digital dollars for feedback on content properties; e.g., a user could be rewarded for watching content, including for watching an entire video and viewing ads, but only if this is coupled with feedback later judged to be informative (the reward is coupled with providing informative feedback, not with watching per se).

The user engagement panel illustrated in FIG. 6 aggregates feedback from the platform in the form of an aggregate score (which could be a genre-normalized view of the current prediction of the statistical regression model pertaining to the type of decision to make in regard to the content). In this example, a user can place a small number of votes for content, can invest his or her points in different quantities on content (e.g., this going into a pool in the style of a pari-mutuel market, with returns proportional to amounts in the pool for investment in content selected for further audience engagement.) A user can also estimate the fraction of his or her friends who will view the content if shown the content, and a range of revenue the content will draw in the opening four weeks of box office if released. The payoff to the user here could be in the form of a content that is purchased in an underlying prediction market, with this interpreted as a disjunctive bet over a set of possible returns.

In providing robustness against manipulation by the community of users, some approaches can include:

adopting a preference for information provided by a diverse user population who is not closely connected in the social network of the media platform giving preference to information that has been influenced by a large number of user inputs or by users who are very active in the community and have made many contributions.

restricting the number of votes, likes or other actions that a user can take (so that users cannot simply say all the content is great, or all the content is bad)

building models of how predictive a user's actions are in regard to content that will be enjoyed by other users, both on and off the platform, and weight inputs according to this measure of the predictiveness of a user (this acts as a natural influence limiter)

insisting that users adopt strong identities to preclude "Sybil" (false-name) attacks restricting the amount of influence a user can have on a future decision to the amount of positive influence a user has achieved on earlier decisions; e.g., providing historical information that is correlated with positive revenue flow, and anti-correlated with negative revenue flow provides the ability to continue to influence future decisions In addition, a score for the trustworthiness of a user can be determined by looking for correlations between sentiment expressed by a user in the context of a video and hidden tags that were provided by the generator of the content. For example, a user who tends to express happiness in segments of a video that were tagged "happy" by content generators is "scored" as being more credible and given a higher weight in terms of how inputs influence decisions than a user who expresses sentiment that tends to be uncorrelated with these "gold standard" emotions that are associated with content.

Robustness to Sybil attacks can be achieved through the use of a social network, under the assumption that it is difficult for Sybil identities to be accepted as friends by honest nodes. This can limit the votes that can be cast based on paths in the social network between users. In this way, the number of bogus votes collected can be limited by the number of new social connections that can be created by false-name IDs, which is assumed to be small due to the social process involved.

One approach to train a statistical machine learning model for the purpose of estimating the value of media content from the data harvested from an instrumented social media platform can proceed in a staged way. For example, one approach to the staged training of a model can:

i. Collect data from the platform and look to build a predictive model of views on platform for some subsequent period of time ii. Collect data from the platform and also from another platform, and look to build a predictive model of views when the same content (e.g., same test format, or same episode) is released to another platform (e.g., YouTube)

iii. Collect data from the platform and look to build a predictive model of views on platform for a sequel to the content, or a reproduced version of the content iv. Collect data from the platform and also from off platform (e.g., movie theaters) and look to build a predictive model of the value of the media content when released off platform (e.g., to theatrical release)

Figure 8:
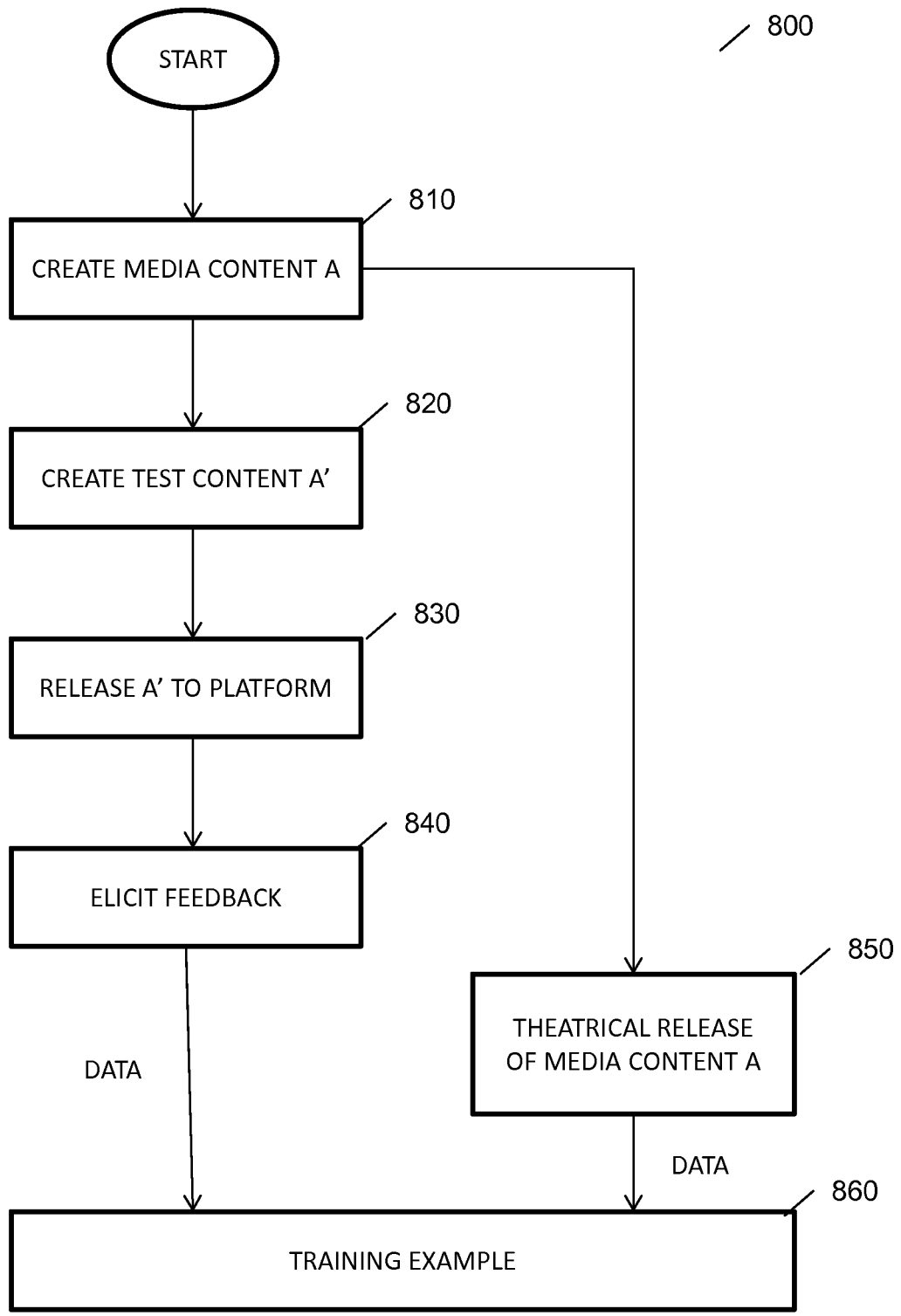
FIG. 8 is a flow diagram illustrating an exemplary process of generating platform data and going to theatrical release for generating training data, according to some embodiments of the disclosed subject matter.

FIG. 8 is a flow diagram illustrating an exemplary process of generating platform data and going to theatrical release for generating training data, according to some embodiments of the disclosed subject matter. FIG. 8 illustrates a high level process 800 in regard to approach (iv) in the above staged training design, where a test format A' of content A is tested on the platform and content A is then released to theaters with the data ultimately combined to provide a training example. At step 810, a media content A is created; at step 820, a test media content A' is created; at step 830, the test media content A' is released to the platform; at step 840, feedbacks are elicited for the test media content A'; at step 850, the media content A is released off-platform (e.g., to a theater) and the off-platform data is gathered; at step 860, both the on-platform data and the off-platform data are fed into a training example to build a predictive model.

Figure 9:
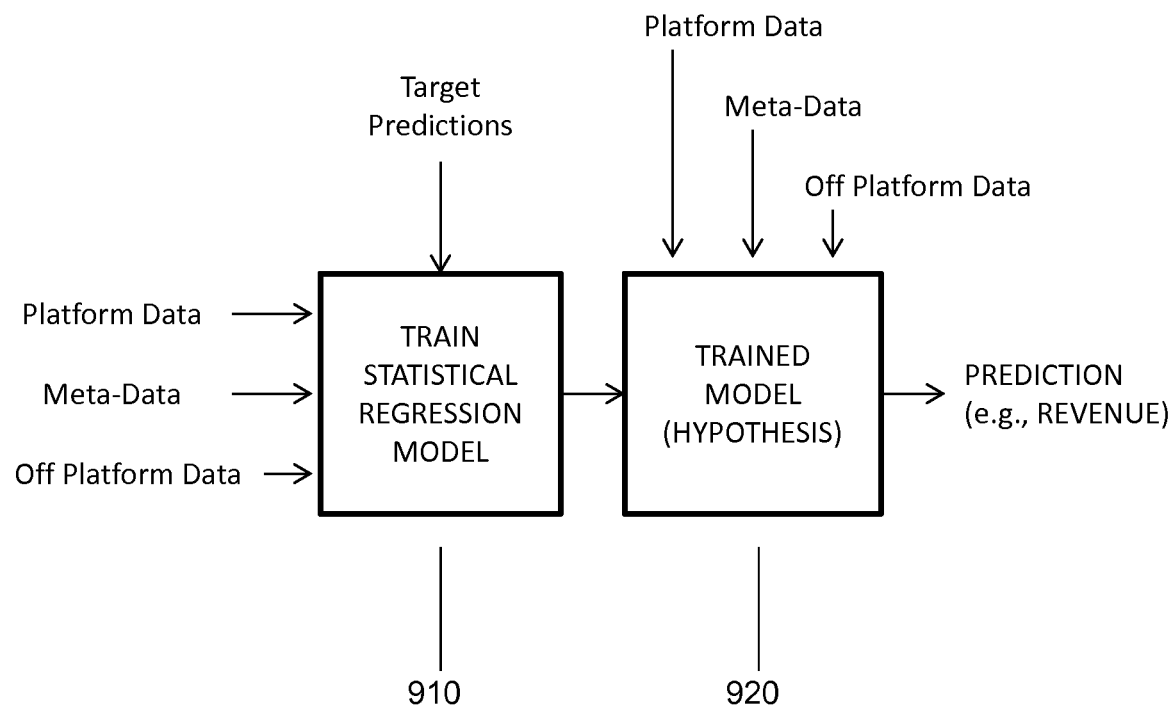
FIG. 9 illustrates an exemplary process of training a statistical regression model for the purpose of then having a hypothesis with which to make future predictions, according to some embodiments of the disclosed subject matter.

A number of machine learning technologies can be employed. These can for example include decision trees, support vector machines, graphical models, non-parametric methods, linear regression, and hierarchical probabilistic models. FIG. 9 illustrates an exemplary process of training a statistical regression model for the purpose of then having a hypothesis with which to make future predictions, according to some embodiments of the disclosed subject matter. At step 910, platform data, meta-data, and off-platform data are fed into a training model along with target predictions in order to train a statistical regression model; at step 920, platform data, meta-data, and off-platform are fed into the trained model (e.g., hypothesis) to generate predictions (e.g., revenue). Specific prediction targets of interest for machine learning based on data harvested from the platform can include:

For movie releases, estimation of the audience size (and thus revenue) in the first four weeks or the opening weekend (e.g., in terms of projected revenue per screen).

For media content that will be released through on-demand streaming over the Internet, estimation of the total number of downloads in the first one month of release, or the ability to monetize through advertising.

For content to be produced for release on a premiere content social media platform, for example a sister platform to the social media platform on which content is tested and refined (as envisioned in the disclosed subject matter), estimation of the rank popularity of the content, perhaps within a specific genre or within a specific time period.

It will be apparent to one of ordinary skill in the art that many other targets and variations are possible. This list above is not intended to be restricting but rather illustrative.

In regard to the prediction of the value of movie content, one way to train the predictive models of the platform can be to release trailers for the movie to the platform prior to a planned theatrical release. In this way, it is possible to collect user behavioral and user action data and use this data, when coupled with metrics such as realized box office revenue to build a predictive model. A similar approach can be employed for training in regard to other prediction targets, including the evaluation of up-take of books based on the release of the initial chapter of a book, or up-take of a new TV series based on the release of the first episode.

Figure 10:
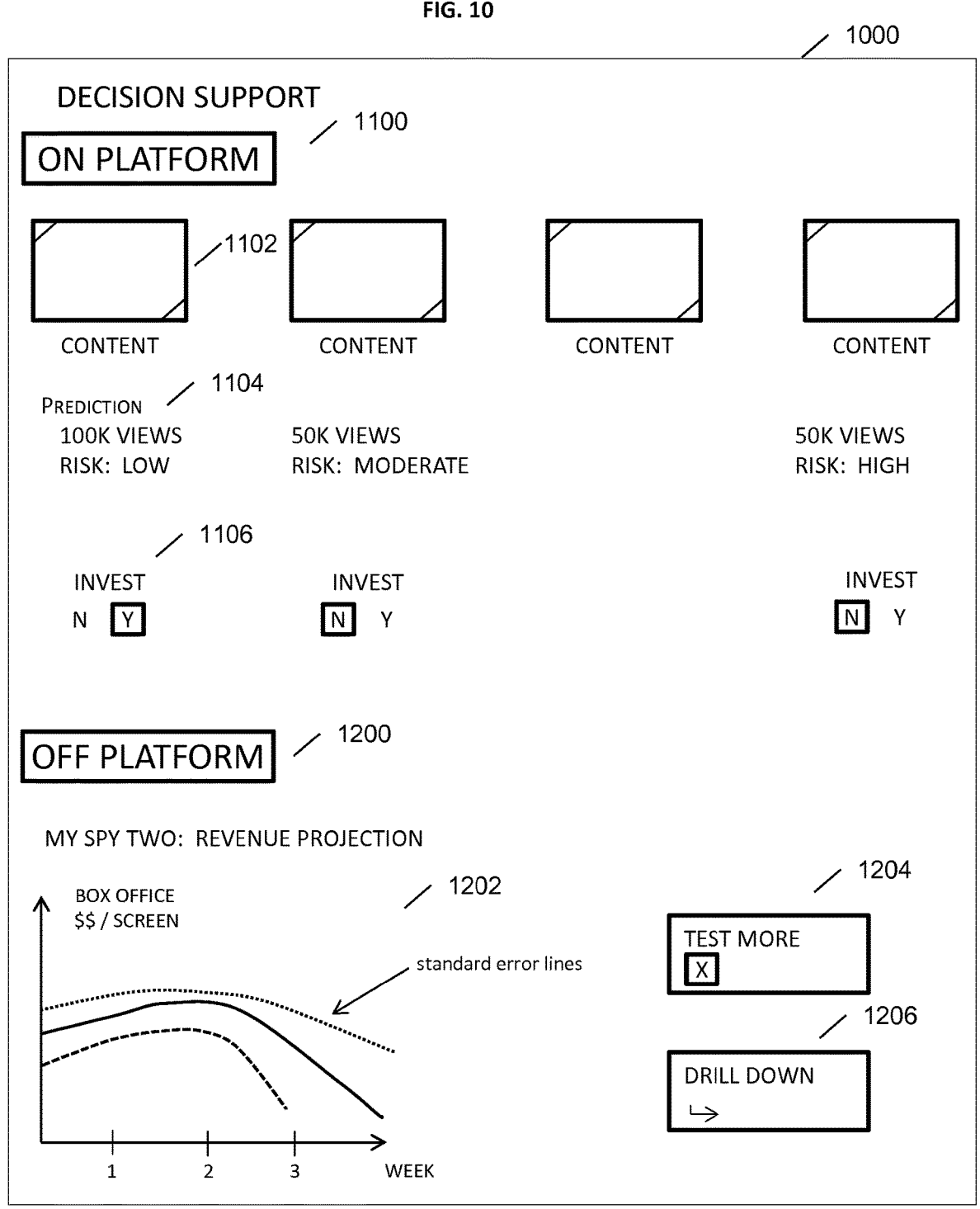
FIG. 10 illustrates a schematic view in regard to the type of decision supports provided by the platform both for "on platform" and "off platform" release, according to some embodiments of the disclosed subject matter.

Given a probabilistic model of the effect of additional investment on the revenue from media content, embodiments of the disclosed subject matter can also be used as a decision support system for determining an optimal investment strategy in the style of portfolio optimization (e.g., given access to statistics in regard to the Sharpe ratio, covariance of return, and other familiar metrics.). In addition to publishing the predictions of the trained regression and classification models, including the possibility of probabilistic models and so with uncertainty made explicit about predictions, embodiments of the disclosed subject matter can provide decision support in the form of an aggregate view with a normalized measure of risk, e.g. as illustrated in FIG. 10.

For contents that are under consideration for further investment, and developed to be released to theaters, the online activity can be used to fit parameters of a decay model for prediction of movie revenue dynamics. This estimated decay model can be presented along with a standard error line to illustrate the uncertainty intrinsic to the prediction, e.g., as illustrated in FIG. 10, which also shows the user clicks "Test More" to indicate that he or she wishes for the content to continue to be engaged with the user base for further testing. As illustrated in FIG. 10, a user interface 1000 can include an on-platform section 1100 and an off-platform section 1200. The on-platform section 1100 can list media content 1102, their respective predictions 1104, their respective suggestion for investment 1106. The off-platform section 1200 can contain a graph of revenue projection, an option to test more 1204, and an option to drill down for more information 1206.

In some embodiments, the platform can automate decisions about where to scale investment and produce more content, closing the loop automatically. This feature can, for example, be used for smaller content properties. One way to address the exploration vs. exploitation problem is through variance-weighted scores; i.e., rather than simply invest in the content with the highest historical average performance, an algorithm can also consider the value of information that comes from exploring alternate contents, and especially contents in which there has so far been little investment and little testing. Multi-armed bandit algorithms can, for example, be suitable for solving this kind of sequential decision problem.

Given predictions about the engagement of users with media content (e.g., the number of downloads or views of content from a particular demographic, or the number of users who would watch the content if redeveloped and released onto a network with a particular producer, director, cast, time slot, etc.), then the value of the content, when produced in different formats, can be ascertained through a competitive auction process.

For an illustrative example, suppose that for some particular media content the decision to be made includes:
  Stop development
  Develop into another 10 minutes of a web series
  Develop as a 50 minute feature, to be released off platform
  Develop as a TV series Suppose also that for each of these there is a prediction of the number of viewers of the content, by different user demographics. The decision that maximizes return-on-investment can be made by first running an auction in order to determine the value of different formats to advertisers. This can take a number of different forms. For example, the bids could be for
  Firm commitments to pay a lump-sum amount for the right to advertise adjacent to the content, perhaps restricted to some period of time in the future.
  Commitments to pay an amount per impression, perhaps restricted to some period of time in the future (or to pay an amount for each impression from a particular demographic)
  A real option, i.e., a payment now for the right to exercise an option later to pay a fixed amount, or an amount per impression, for the right to advertise to users who view or otherwise engage with the content
  The right to co-sponsor and be involved in the ongoing development of the content, for example through product placement or other blending of the values of the advertiser's brand and the content Many other variations of exactly how the bid from an advertiser is structured are possible. This list above is intended to be illustrative and not restricting. Auction rules themselves can be configured—e.g., second price auctions are useful for simplifying the bidding process, and iterative (open-format) auctions are useful for interdependent value problems where information about the value assigned by one bidder can influence the value estimate of another bidder. The embodiments of the disclosed subject matter are not intended to be restricted to a particular way of deciding the payments of winners, or to a particular structure for the auction process. Rather, emphasis is given to sharing of predictions (e.g., in the form of "scores" assigned to media content by the platform) with prospective bidders, and a competitive process with which to assign the value to the contents and guide decision making in regard to the content.

For some contents, the auction can have multiple winners. For example, an auction for the right to advertise on content that is rolled out into traditional media such as a network television show can support multiple winners because there are multiple slots available for ads in each commercial break and opportunities to advertise according to demographic, location or time of day. These auctions could also be combinatorial, so that advertisers can bid on the right to have an advertisement in every commercial break associated with a media content, or to have a longer ad that takes up the entire break. Similarly, financing or production rights can be auctioned in the same auction as the advertising rights, rolling together the "sell side" and the "buy side." Externalities could also be expressed in an auction; e.g., an advertiser wants the right to be the only advertiser in a particular vertical (e.g., consumer beverages) that is associated with the content. Where bids combine lump-sum and incremental payments, or reflect competition for options on the content, winner determination can use predictions about the number of users in different demographics, in deciding how to compare a lump sum bid with a bid for a "per impression" amount. Winner determination can also be configured to reflect risk-preferences of the bid taker: factoring the uncertainty about predictions in deciding which bid (or set of bids) should be chosen as the winning bids.

During an auction process, there can be a financial outcome associated with each possible decision that is available for the content. For example, for one outcome (e.g., develop as a TV series) the financial outcome might reflect that 10 advertisers have each committed to make a lump-sum payment, coupled with an additional commitment to pay an incremental amount for each user impression in a particular demographic. For another outcome (e.g., develop another 10 minutes for use as a web series) the outcome might reflect that 1 advertiser is willing to make a lump-sum payment to advertise alongside the content when it is produced.

Given that the projected revenue for different contents in different formats can be determined by the auction, embodiments of the disclosed subject matter can allow a decision to be made in regard to content going forward—comparing the estimated cost of different decisions with the projected revenue. This can enable a decision such as "we can produce this content for $x, and have estimated revenue of $y and thus an estimated yield of y/x."

In addition, producers and studios can be involved in an auction for the right to produce future versions of media content. This can be done both with and without having first collected bids from advertisers. Without bids from advertisers, the producers and studios can already use the predictions generated by the platform in regard to user engagement to formulate a bid for the right to produce the content. By collecting bids from advertisers first, producers and studios have additional information in hand. The winning bids from advertisers, when bundled with the media content, can give the media content the characteristic of a financial instrument.

Given the winning bids, for example in the form of lump-sum payments, or in the form of commitments to buy options at a particular exercise price on media content, or a commitment to buy a certain number of impressions from a particular user demographic, a studio or producer can reduce the risk in deciding how much to bid for the media content—some or all of the advertising revenue has been "pre sold." Upon purchasing the media content, the producer or studio can also acquire the rights to the revenue stream that will accrue from these commitments from advertisers.

The auction market can be used to determine the value of content, with advertisers placing bids on an individual piece of content or a portfolio of content (and the auction market clearing to optimize revenue). The auction market can also be used to sell content or a portfolio of content (in its current form or including future versions or derivatives) to parties such as studios, production companies, or distributors. The auction market can also be used to allow members of the community to determine the content that should receive future development, in present form or in a variation, in the manner of crowd-funding, and for example with each individual investor receiving a share of the subsequent revenue generated by the content.

The disclosed subject matter and its ability to aggregate data in regard to media content and provide estimates as to metrics of interest in regard to media content can also be used to provide the analytics to guide on going investment decisions; e.g., for re-testing a studio's library content in order to optimize the content value across both current and emerging media platforms.

In addition, a user can purchase branded content. A user would be able to watch content and then interactively click on an item (a table, a pair of sneakers, etc.) and then have the opportunity to purchase a limited edition product related to the content. Consumer behavior in regard to the purchase of branded content can be another indication as to the strength of connection that consumers have with media content.

Figure 11:
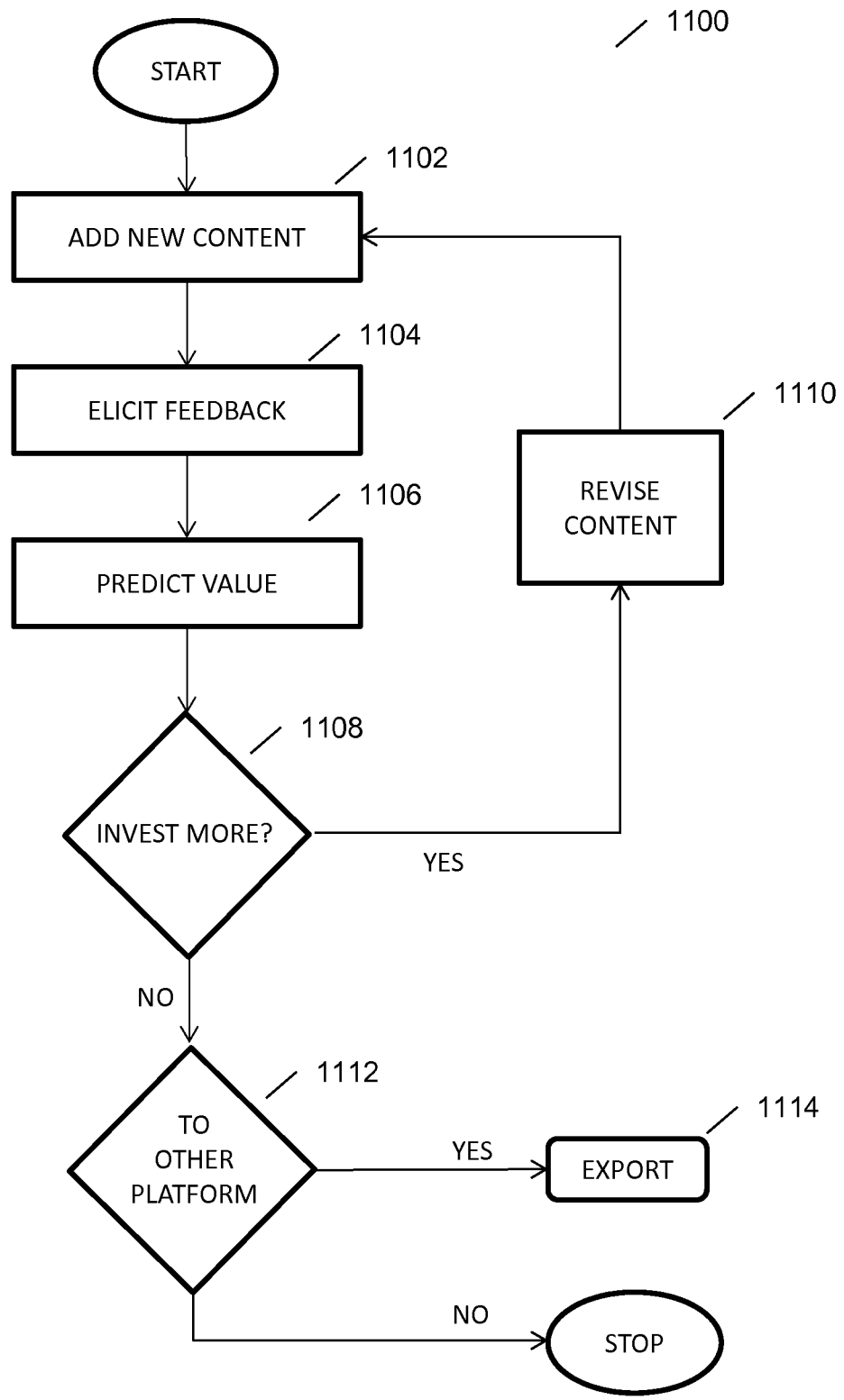
FIG. 11 is a flow diagram illustrating an exemplary process of adding new content for the purpose of a test-refine cycle, according to some embodiments of the disclosed subject matter.

Moreover, some embodiments of the disclosed subject matter can include features such as:
- an open API to allow other platforms to access (selected) content on the platform and distribute to their own user bases, which through measurement of online activity on these other platforms extend the data pool
- allowing content owners to restrict access to content to a particular niche community of users (e.g., based on demographic or use statistics of the platform, including niche content with respect to which they have good accuracy), in order to build a community, and a buzz, and gain a selective user base for the evaluation of the content.
- charging for upload to the platform. As illustrated in FIG. 7, a user interface 700 can list the available items 710 and their respective charges in points 720.
- directing content towards users who can provide the most useful information for a particular niche area, and in performing this careful matching (e.g., formulated and solved as an assignment problem) of users to test content make the most use of the chief resource—that of user attention In some embodiments, as illustrated in FIG. 11, the platform for engaging a user community and measuring user behavior and actions can be used to test, refine, and test again a sequence of "test formats," with each test format of the media content perhaps increasing in time or number of episodes or some other measure to reflect an increasing level of investment in the content. Once an initial test format is engaged with the community and data collected, a second test format can then be engaged, more feedback obtained, and so forth. Content can be incrementally rolled out in this manner, in order to make staged investment decisions rather than a one-time investment based on limited information. Ultimately the content may be exported to another platform or the process stopped and a decision made in regard to further investment.

FIG. 11 is a flow diagram illustrating an exemplary process 1100 of adding new content for the purpose of a test-refine cycle, according to some embodiments of the disclosed subject matter. At step 1102, a new media content is added; at step 1104, feedbacks are elicited for the media content; at step 1106, the media content is evaluated (e.g., predicting a value); at step 1108, a decision is made regarding whether to invest more on the media content; if the answer is positive, at step 1110, the media content is optimized for more evaluation; if the answer is negative, at step 1112, a decision is made regarding whether to use it in other platforms; if the answer is positive, at step 1114, the media content is exported to other platforms; otherwise, the process stops.

As an example, if a game publisher has an idea for a game, then an alpha test format can be created with a single level that is then engaged with the community. Based on feedback in terms of behavioral metrics (e.g., how many people played and completed the level, how many people know about the game but didn't try it, how many people stopped playing the game before completing the level, etc.), a decision can then be made whether or not to invest in further development of the game, for example: 1 additional level, or 2, 5, or so on. As a second example, consider engaging the community with a 90 second alpha test format of a media content such as a movie, and then based on feedback making a second beta test format for example of length 90 seconds, 120 seconds or so on.

Embodiments of the disclosed subject matter can allow measuring consumer behavior to test formats of a media content, and then being able to respond with an adaptive decision in regard to investment, rather than trying to predict it up front. By keeping the engagement of an active community of users, data can be collected in regard to consumption patterns, interests, and so forth in real time and the supply of content can be adjusted to reflect what is working and what is not working.

In one embodiment of the disclosed subject matter, a user interface can be styled around a volcanic theme, with the interface providing signals to users in regard to the popularity of different content. For example, a scheme can be adopted to imitate warning schemes from the US Geological Service:
- normal (could be color coded green): a "non-eruptive phase" for a media content, with no immediate risk of additional investment or promotion to status as premium or featured content
- advisory (could be color coded yellow): an "elevated unrest" phase for a media content, with behavioral and user actions indicating the content could have some value, and advice to users to watch
- watch (could be color coded orange): "escalating unrest" phase for a media content, indicating that the content that might be promoted for additional investment based on current levels of user engagement
- warning (could be color coded red): additional investment and/or promotion or featuring in regard to the media content is imminent based on user engagement The different categories can be defined in terms of quantifiable measures, for example the number of views received by content over the past month or more generally inference done through the method of statistical machine learning in regard to the likely value of contents. This theme can be coupled with a volcano theme for the premium content and successful user-generated content on the site; e.g., "Fire" the hottest content currently trending as defined by the interactivity and feedback of the community and filtered, the "Inner core" indicating featured premium content, likely gaining continuing investment, the "Outer Core" indicating additional featured premium content, the "Mantle" indicating premium content, placed into different zones based on number of views and the "Crust" indicating user-generated content that has exceeds a first tier hurdle requirement in terms of gaining sufficient engagement from the user base.

Figure 12:
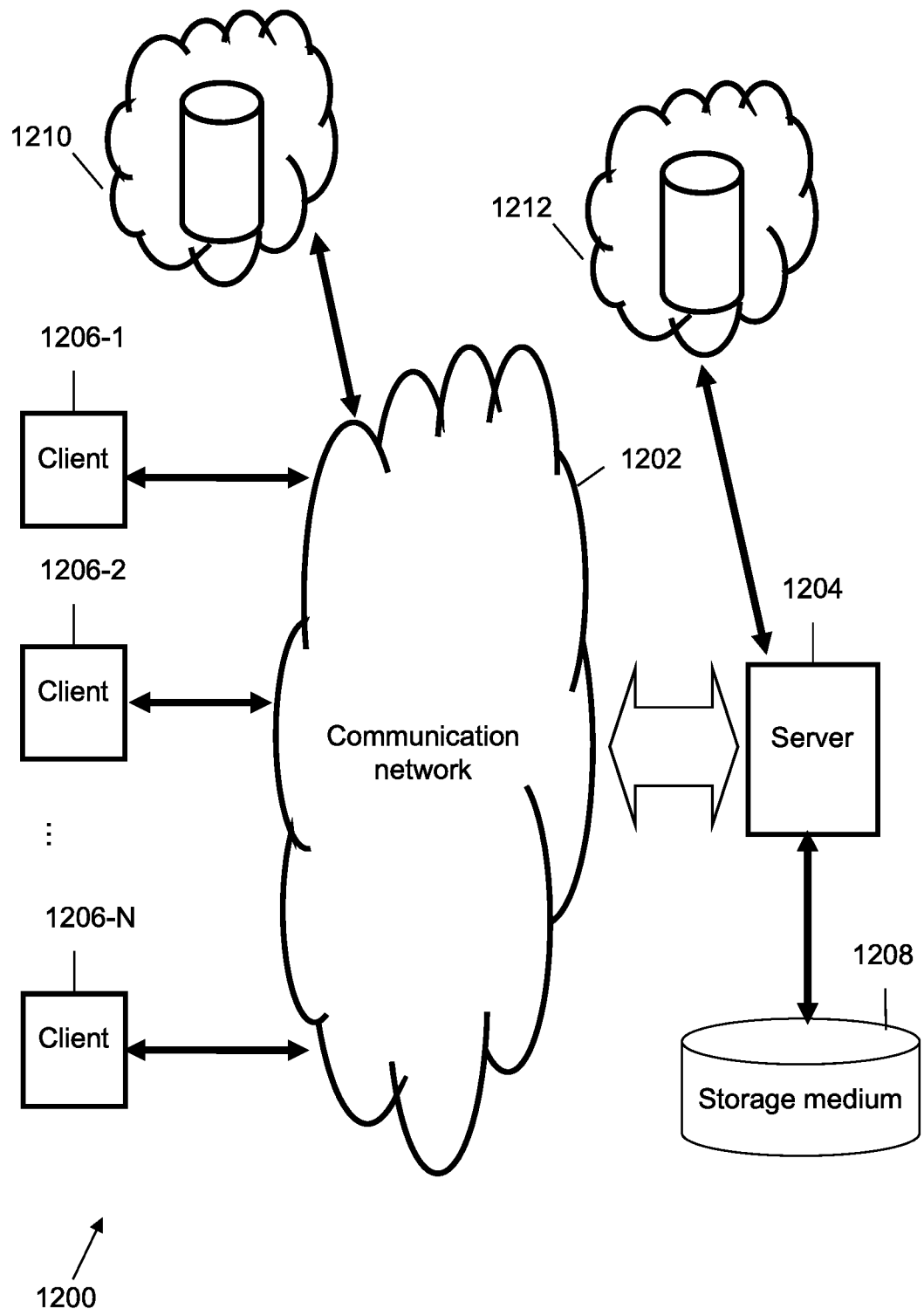
FIG. 12 illustrates a diagram of an exemplary networked communication environment.

Embodiments of the disclosed subject matter can be implemented in a networked computing environment. FIG. 12 illustrates a diagram of an exemplary networked communication arrangement 1200 in accordance with an embodiment of the disclosed subject matter. The networked communication arrangement 1200 can include a server 1204, at least one client 1206 (e.g., client 1206-1, 1206-2, . . . 1206-N), a physical storage medium 1208, and a cloud storage 1210 and 1212, which can all be coupled, directly or indirectly to a communication network 1202.

Each client 1206 can communicate with the server 1204 to send data to, and receive data from, the server 1204 across the communication network 1202. Each client 1206 can be directly coupled to the server 1204. Alternatively, each client 1206 can be connected to server 1204 via any other suitable device, communication network, or combination thereof. For example, each client 1206 can be coupled to the server 1204 via one or more routers, switches, access points, and/or communication network (as described below in connection with communication network 1202). A client 1206 can include, for example, a desktop computer, a mobile computer, a tablet computer, a cellular device, a gaming console, a smartphone, or any computing systems that are capable of performing computation.

Server 1204 can be coupled to at least one physical storage medium 1208, which can be configured to store data for the server 1204. Preferably, any client 1206 can store data in, and access data from, the physical storage medium 1208 via the server 1204. FIG. 12 shows the server 1204 and the physical storage medium 1208 as separate components; however, the server 1204 and physical storage medium 1208 can be combined together. FIG. 12 also shows the server 1204 as a single server; however, server 1204 can include more than one server. FIG. 12 shows the physical storage medium 1208 as a single physical storage medium; however, physical storage medium 1208 can include more than one physical storage medium. The physical storage medium 1208 can be located in the same physical location as the server 1204, at a remote location, or any other suitable location or combination of locations.

FIG. 12 shows two embodiments of a cloud storage 1210 and 1212. Cloud storage 1210 and/or 1212 can store data from physical storage medium 1208 with the same restrictions, security measures, authentication measures, policies, and other features associated with the physical storage medium 1208. FIG. 12 shows the cloud storage 1212 separate from the communication network 1202; however, cloud storage 1212 can be part of communication network 1202 or another communication network. The server 1204 can use only cloud storage 1210, only cloud storage 1212, or both cloud storages 1210 and 1212. While, FIG. 12 shows one cloud storage 1210 and one cloud storage 1212, more than one cloud storage 1210 and/or more than one cloud storage 1212 or any suitable combination thereof can be used.

The communication network 1202 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks can be implemented with any number of hardware and software components, transmission media and network protocols. FIG. 12 shows the network 1202 as a single network; however, the network 1202 can include multiple interconnected networks listed above.

Figure 13:
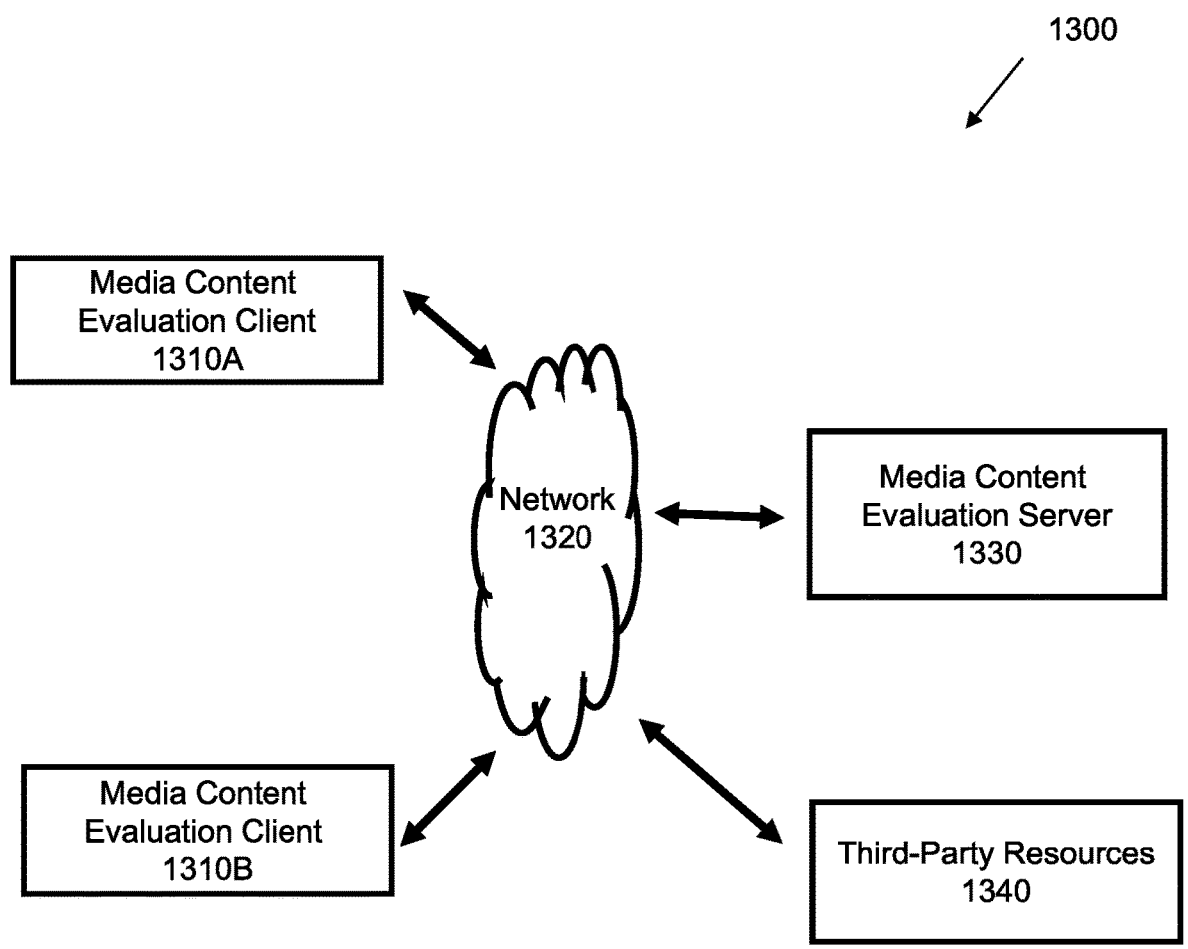
FIG. 13 illustrates a block diagram of an exemplary arrangement for media content evaluation in accordance with certain embodiments of the disclosed subject matter.

FIG. 13 illustrates a block diagram of an exemplary arrangement of media content evaluation 1300 in accordance with certain embodiments of the disclosed subject matter. The media content evaluation arrangement 1300 can include one or more media content evaluation clients 1310A and 1310B, a media content evaluation server 1330, and a network 1320. The media content evaluation arrangement 1300 can further include third-party resources 1340 (e.g., other online resources or social media websites, etc.). The media content evaluation clients 1310A and 1310B, the media content evaluation server 1330, and the third-party resources 1340 can be directly or indirectly coupled to the network 1320 and communicate among each other via the network 1320, which can be wired, wireless, or a combination of both.

The media content evaluation client 1310A or 1310B, like each client 1206 illustrated in FIG. 12, can include a desktop computer, a mobile computer, a tablet computer, a cellular device, a gaming console, a smartphone, or any computing systems that are capable of performing computation. The media content evaluation server 1330 can also include a desktop computer, a mobile computer, a tablet computer, a cellular device, a gaming console, a smartphone, or any computing systems that are capable of performing computation. The third-party resources 1340 can be operated, controlled, or associated with the same entity that operates, controls, or is associated with the media content evaluation server 1330; alternatively, the third-party resources 1340 can be operated, controlled, or associated with a third party. Although FIG. 13 shows the media content evaluation server 1330 as a single server, the media content evaluation server 1330 can include more than one physical and/or logical servers. The network 1320, like the communication network 1202 illustrated in FIG. 12, can include the Internet, a cellular network, a telephone network, a computer network, a packet switching network, a line switching network, a local area network (LAN), a wide area network (WAN), a global area network, a corporate network, an intranet, a virtual network, or any number of private networks currently referred to as an Intranet, and/or any other network or combination of networks that can accommodate data communication. Such networks can be implemented with any number of hardware and software components, transmission media and network protocols. FIG. 13 shows the network 1320 as a single network; however, the network 1320 can include multiple interconnected networks listed above.

Figure 14:
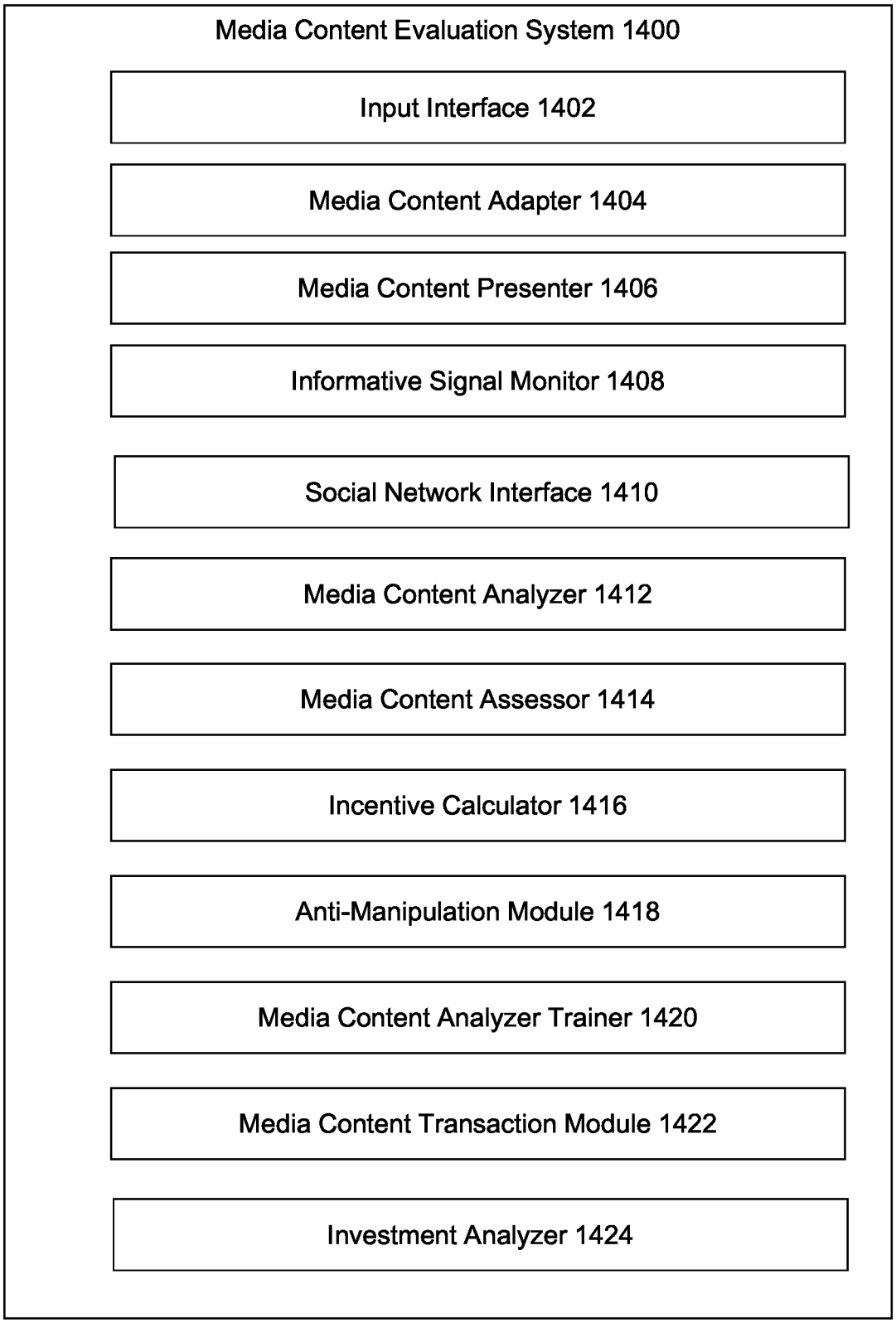
FIG. 14 illustrates a block diagram of an exemplary media content evaluation system in accordance with certain embodiments of the disclosed subject matter.

FIG. 14 illustrates a block diagram of an exemplary media content evaluation system 1400 in accordance with certain embodiments of the disclosed subject matter. The media content evaluation system 1400 can include an input interface 1402, a media content adapter 1404, a media content presenter 1406, an informative signal monitor 1408, a social network interface 1410, a media content analyzer 1412, a media content assessor 1414, an incentive calculator 1416, an anti-manipulation module 1418, a media content analyzer trainer 1420, a media content transaction module 1422, and an investment analyzer 1424. One or more of these components are optional. One or more components can be added.

The input interface 1402 can receive a media content for evaluation by users in an online community. The media content can come from a media content creator, owner, or vendor. The media content can be in any suitable media formats, e.g., audio, video, text, etc. The input interface can be in software, hardware, or a combination of both. The input interface can be a wired interface, such as a USB connection. Alternatively, the input interface can be a wireless interface, such as a Wi-Fi connection. The input interface 1402 can also be any other mechanism by which information to be provided to the media content evaluation system 1400. In some embodiments, the input interface can also be an application programming interface (API). More details on the functionalities and features of the input interface 1402 can be found in other portions of this document (e.g., FIG. 1-11 and their corresponding descriptions).

The media content adapter 1404 can adapt the input media content and make it suitable for evaluation by the users in the online community. For example, the media content adapter can convert the input media content into a different coding (e.g., lower resolution of a video clip), can trim the input media content into a shorter duration, can divide the input media content into several smaller pieces, or can convert the media content into a different format (e.g., extract audio/text from a video clip). More details on the functionalities and features of the media content adapter 1404 can be found in other portions of this document (e.g., FIG. 1-11 and their corresponding descriptions).

The media content presenter 1406 can present the media content to the users in the online community for evaluation. In the event that the input media content has been adapted by the media content adapter 1404, the media content presenter 1406 can present the adapted media content to the users in the online community for evaluation. In some embodiments, the media content presenter 1406 can also control access of the users in the online community to the media content. For example, the media content presenter 1406 can present a particular media content to certain users but not to other users or can present the particular media content to certain users first before presenting it to other users. In another example, the media content presenter 1406 can present a particular media content to a user before presenting another media content to the user. In yet another example, the media content presenter 1406 can present only a portion of a particular media content to certain users. More details on the functionalities and features of the media content presenter 1406 can be found in other portions of this document (e.g., FIG. 1-11 and their corresponding descriptions).

The informative signal monitor 1408 can gather informative signals relating to the media content from the users in the online community. The informative signals can include users' online behaviors and actions relating to the media content (e.g., viewing a particular portion of a video clip repeatedly, writing comments/reviews about a video clip, recommending a video clips to friends, etc.). The informative signals can carry information about how users think about or react to media content and therefore can be useful in evaluating media content. In some embodiments, the informative signals can include user behavior actions and user engagement actions. User behavioral actions can include view, skip, forward, pause, rewind, and comment, etc. User engagement actions can include selection of an emoticon, a facial expression, body language, textual, expression of emotion, a sharing decision, a vote, a like, an investment in an internal prediction market, a prediction of the popularity or revenue of a content, a prediction of how many friends will watch the content, a prediction of whether the content will receive investment, and a completed survey, etc. In some embodiments, a user engagement action can include (1) expressing emotion; (2) voting; (3) defining quality associated with the media content; (4) predicting a future quantity associated with the media content; (5) characterizing the media content; and (6) associating a quantity of on-platform currency with the media content. More details on the functionalities and features of the informative signal monitor 1408 can be found in other portions of this document (e.g., FIG. 1-11 and their corresponding descriptions).

The social network interface 1410 can gather additional feedbacks relating to the media content. For example, the social network interface 1410 can retrieve user feedbacks from other social network websites (e.g., Facebook, Twitter, etc.) or online resources (e.g., online forums, etc.). These additional feedbacks can be useful for evaluating media content. More details on the functionalities and features of the social network interface 1410 can be found in other portions of this document (e.g., FIG. 1-11 and their corresponding descriptions).

The media content analyzer 1412 can evaluate the media content at least partially based on the informative signals form the users and generate an analysis result relating to the media content. In some embodiments, the media content analyzer 1412 can also evaluate the media content at least partially based on profile information of the users in the online community. More details on the functionalities and features of the media content analyzer 1412 can be found in other portions of this document (e.g., FIG. 1-11 and their corresponding descriptions).

The media content assessor 1414 can assess the media content at least partially based on the analysis result of the media content analyzer and an objective function received from the input interface. An objective function can provide a criterion by which a media content is assessed based on the analysis result of the media content analyzer. In some embodiments, if an object function defines certain risk factors, the media content assessor can assess a risk associated with the media content. In one example, the media content assessor can assess the financial risk for further investment in the media content. In some other embodiments, the media content assessor 1414 can also automatically decide whether the media content is to be optimized then presented to the users in the online community again for evaluation. In some other embodiments, the media content assessor 1414 can also automatically decide whether the media content is to be optimized then presented to the users in the online community again for evaluation, based on transaction requests (e.g., bids from users, investors, or advertisers, etc.) received for the media content. For example, when a bid is received on the media content from a user in the community, decisions in regard to optimization and development of the media content can depend at least in part on the bid. When a bid is received from an investor, decisions in regard to optimization and development of the media content can depend at least in part on the bid. When one or more bids are received from an advertiser, the one or more bids can be combined with the media content to form a financial asset, which can receive one or more bids from an investor for the financial asset; an auction can be held to allocate a right associated with the financial asset. More details on the functionalities and features of the media content assessor 1414 can be found in other portions of this document (e.g., FIG. 1-11 and their corresponding descriptions).

The incentive calculator 1416 can determine an incentive to the users in the online community at least partially based on the informative signals from the users. An incentive can be in various forms, such as premiere tickets, concert tickets, merchandise, discounts, DVD's/CDs, direct downloads, etc. In some embodiments, the incentive calculator 1416 can determine the incentive to the users in the online community at least partially based on the analysis result of the media content analyzer. In some other embodiments, the incentive calculator 1416 can determine the incentive to one user in the online community at least partially based on one of (1) informative signals from other users in the online community, (2) weight assigned to the informative signals from the user by the media content analyzer in evaluating the media content, (3) correlation between the informative signals from the user and a gold standard action associated with the media content, (4) time of the informative signals from the user relative to time of the informative signals from the other users, (5) matching of the informative signals from the user with the informative signals from the other users, (6) quality of the informative signals from the user, and (7) ranking of the informative signals from the user among the informative signals from the other users. More details on the functionalities and features of the incentive calculator 1416 can be found in other portions of this document (e.g., FIG. 1-11 and their corresponding descriptions).

The anti-manipulation module 1418 can prevent manipulation of the informative signals from the users. In some embodiments, the anti-manipulation module 1418 can prevent manipulation of the informative signals from the users at least partially based on profile information of the users in the online community. Anti-manipulation mechanisms can include, for example, adopting a diverse user population who are not closely connected, giving preference to users who are active in the community and have made many past contributions, restricting the number or type of informative signals, building and utilizing predictability models of users, and imposing strong identity requirements (e.g., to prevent "Sybil" attacks). More details on the functionalities and features of the anti-manipulation module 1418 can be found in other portions of this document (e.g., FIG. 1-11 and their corresponding descriptions).

The media content analyzer trainer 1420 can train the media content analyzer. In some embodiments, the media content analyzer trainer 1420 can train a statistical regression model for the purpose of then having a hypothesis with which to make future evaluations. In one example, an approach to train a statistical machine learning model for the purpose of evaluating media content from the data harvested from an online community proceed in a staged way. For example, one approach to the staged training of a model can: (1) collect data from the platform and look to build a predictive model of views on platform for some subsequent period of time, (2) collect data from the platform and also from another platform, and look to build a predictive model of views when the same content (e.g., same test format, or same episode) is released to another platform (e.g., You-Tube), (3) collect data from the platform and look to build a predictive model of views on platform for a sequel to the content, or a reproduced version of the content. (4) collect data from the platform and also from off platform (e.g., movie theaters) and look to build a predictive model of the value of the media content when released off platform (e.g., to theatrical release). More details on the functionalities and features of the media content analyzer trainer 1420 can be found in other portions of this document (e.g., FIG. 1-11 and their corresponding descriptions).

The media content transaction module 1422 can facilitate transactions of the media content. In some embodiments, the media content transaction module 1422 can auction a right associated with the media content. The right associated with the media content can include (1) a right to own the media content, (2) a right to lease the media content for a period of time, (3) a right to advertise relating to the media content, and (4) a right to develop a derivative media content relating to the media content. More details on the functionalities and features of the media content transaction module 1422 can be found in other portions of this document (e.g., FIG. 1-11 and their corresponding descriptions).

The investment analyzer 1424 can recommend an investment strategy to an investor at least partially based on the analysis result of the media content analyzer and a risk profile of the investor. A risk profile of the investor can, for example, indicate the risk level the investor can tolerate. In one example, the investment analyzer 1424 can recommend an investor to invest more on a media content (e.g., to optimize and reevaluate the media content, or to push the media content towards mass production, etc.) In another example, the investment analyzer 1424 can recommend an investor to stop further investment in a media content. More details on the functionalities and features of the investment analyzer 1424 can be found in other portions of this document (e.g., FIG. 1-11 and their corresponding descriptions).

Other embodiments of media content evaluation system can include additional modules, fewer modules, or any other suitable combination of modules that perform any suitable operation or combination of operations.

Figure 15:
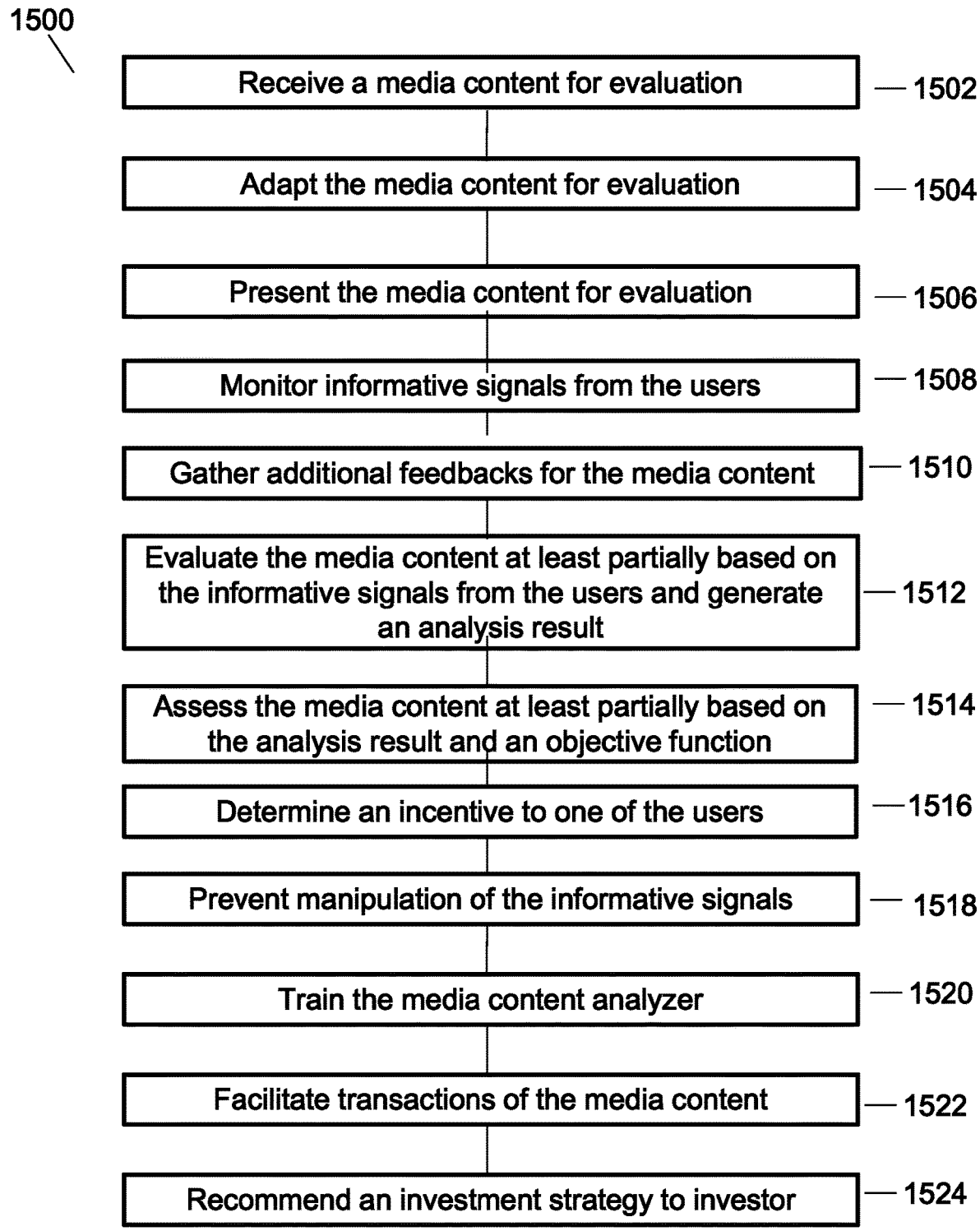
FIG. 15 illustrates an exemplary process of media content evaluation in accordance with certain embodiments of the disclosed subject matter.

FIG. 15 illustrates an exemplary process of media content evaluation in accordance with certain embodiments of the disclosed subject matter. The process 1500 can be modified by, for example, having one or more stages rearranged, changed, added and/or removed.

At stage 1502, a media content can be received for evaluation by users in an online community. The media content can come from a media content creator, owner, or vendor. The media content can be in any suitable media formats, e.g., audio, video, text, etc. In some embodiments, the media content can be received via an input interface (e.g., an application programming interface or API).

At stage 1504, the media content can be adapted suitable for evaluation by the users in the online community. For example, the media content received can be converted into a different coding (e.g., lower resolution of a video clip), can be trimmed into a shorter duration, can be divided into several smaller pieces, or can be converted into a different format (e.g., extract audio/text from a video clip).

At stage 1506, the media content can be presented to the users in the online community for evaluation. In some embodiments, access of the users in the online community to the media content can be controlled. For example, certain users, but not other users, can be presented with a particular media content; certain users can be presented with the particular media content first before other users; a particular media content can be presented to a user before another media content. In yet another example, only a portion of a particular media content can be presented to certain users.

At stage 1508, informative signals relating to the media content can be monitored from the users in the online community for evaluation. The informative signals can include user behavior actions and user engagement actions. User behavioral actions can include view, skip, forward, pause, rewind, and comment, etc. User engagement actions can include selection of an emoticon, a facial expression, body language, textual, expression of emotion, a sharing decision, a vote, a like, an investment in an internal prediction market, a prediction of the popularity or revenue of a content, a prediction of how many friends will watch the content, a prediction of whether the content will receive investment, and a completed survey, etc. In some embodiments, a user engagement action can also include (1) expressing emotion; (2) voting; (3) defining quality associated with the media content; (4) predicting a future quantity associated with the media content; (5) characterizing the media content; and (6) associating a quantity of on-platform currency with the media content.

At stage 1510, additional feedbacks can be gathered relating to the media content. For example, user feedbacks from other social network websites (e.g., Facebook, Twitter, etc.) or online resources (e.g., online forums, etc.) can be retrieved. These additional feedbacks can be useful for evaluating media content.

At stage 1512, the media content can be evaluated at least partially based on the informative signals from the users. An analysis result can also be generated at this stage. In some embodiments, the media content can also be evaluated at least partially based on profile information of the users in the online community.

At stage 1514, the media content can be assessed at least partially based on the analysis result and an objective function received. An objective function can provide a criterion by which a media content is assessed based on the analysis result. In some embodiments, if an object function defines certain risk factors, a risk associated with the media content can be assessed. In one example, the financial risk for further investment in the media content can be assessed. In some other embodiments, whether the media content is to be optimized then presented to the users in the online community again for evaluation can be automatically decided. In some other embodiments, whether the media content is to be optimized then presented to the users in the online community again for evaluation can be automatically decided based on transaction requests (e.g., bids from users, investors, or advertisers, etc.) received for the media content. For example, when a bid is received on the media content from a user in the community, decisions in regard to optimization and development of the media content can depend at least in part on the bid. When a bid is received from an investor, decisions in regard to optimization and development of the media content can depend at least in part on the bid. When one or more bids are received from an advertiser, the one or more bids can be combined with the media content to form a financial asset, which can receive one or more bids from an investor for the financial asset; an auction can be held to allocate a right associated with the financial asset.

At stage 1516, an incentive to one of the users in the online community can be determined at least partially based on the informative signals from the one of the users. An incentive can be in various forms, such as premiere tickets, concert tickets, merchandise, discounts, DVD's/CDs, direct downloads, etc. In some embodiments, the incentive to the users in the online community can be determined at least partially based on the analysis result of the media content analyzer. In some other embodiments, the incentive to one user in the online community can be determined at least partially based on one of (1) informative signals from other users in the online community, (2) weight assigned to the informative signals from the user by the media content analyzer in evaluating the media content, (3) correlation between the informative signals from the user and a gold standard action associated with the media content, (4) time of the informative signals from the user relative to time of the informative signals from the other users, (5) matching of the informative signals from the user with the informative signals from the other users, (6) quality of the informative signals from the user, and (7) ranking of the informative signals from the user among the informative signals from the other users.

At stage 1518, manipulation of the informative signals from the users can be prevented. Manipulation of the informative signals from the users can be prevented at least partially based on profile information of the users in the online community. Anti-manipulation mechanisms can include, for example, adopting a diverse user population who are not closely connected, giving preference to users who are active in the community and have made many past contributions, restricting the number or type of informative signals, building and utilizing predictability models of users, and imposing strong identity requirements (e.g., to prevent "Sybil" attacks).

At stage 1520, the media content analyzer can be trained. A statistical regression model for the purpose of then having a hypothesis with which to make future evaluations can be trained. In one example, an approach to train a statistical machine learning model for the purpose of evaluating media content from the data harvested from an online community proceed in a staged way. For example, one approach to the staged training of a model can: (1) collect data from the platform and look to build a predictive model of views on platform for some subsequent period of time, (2) collect data from the platform and also from another platform, and look to build a predictive model of views when the same content (e.g., same test format, or same episode) is released to another platform (e.g., YouTube), (3) collect data from the platform and look to build a predictive model of views on platform for a sequel to the content, or a reproduced version of the content. (4) collect data from the platform and also from off platform (e.g., movie theaters) and look to build a predictive model of the value of the media content when released off platform (e.g., to theatrical release).

At stage 1522, the transactions of the media content can be facilitated. In some embodiments, a right associated with the media content can be auctioned. The right associated with the media content can include (1) a right to own the media content, (2) a right to lease the media content for a period of time, (3) a right to advertise relating to the media content, and (4) a right to develop a derivative media content relating to the media content.

At stage 1524, an investment strategy can be recommended to an investor at least partially based on the analysis result of the media content analyzer and a risk profile of the investor. A risk profile of the investor can, for example, indicate the risk level the investor can tolerate. In one example, an investor can be recommended to invest more in a media content (e.g., to optimize and reevaluate the media content, or to push the media content towards mass production, etc.) In another example, an investor can be recommended to stop further investment in a media content.

Figure 16:
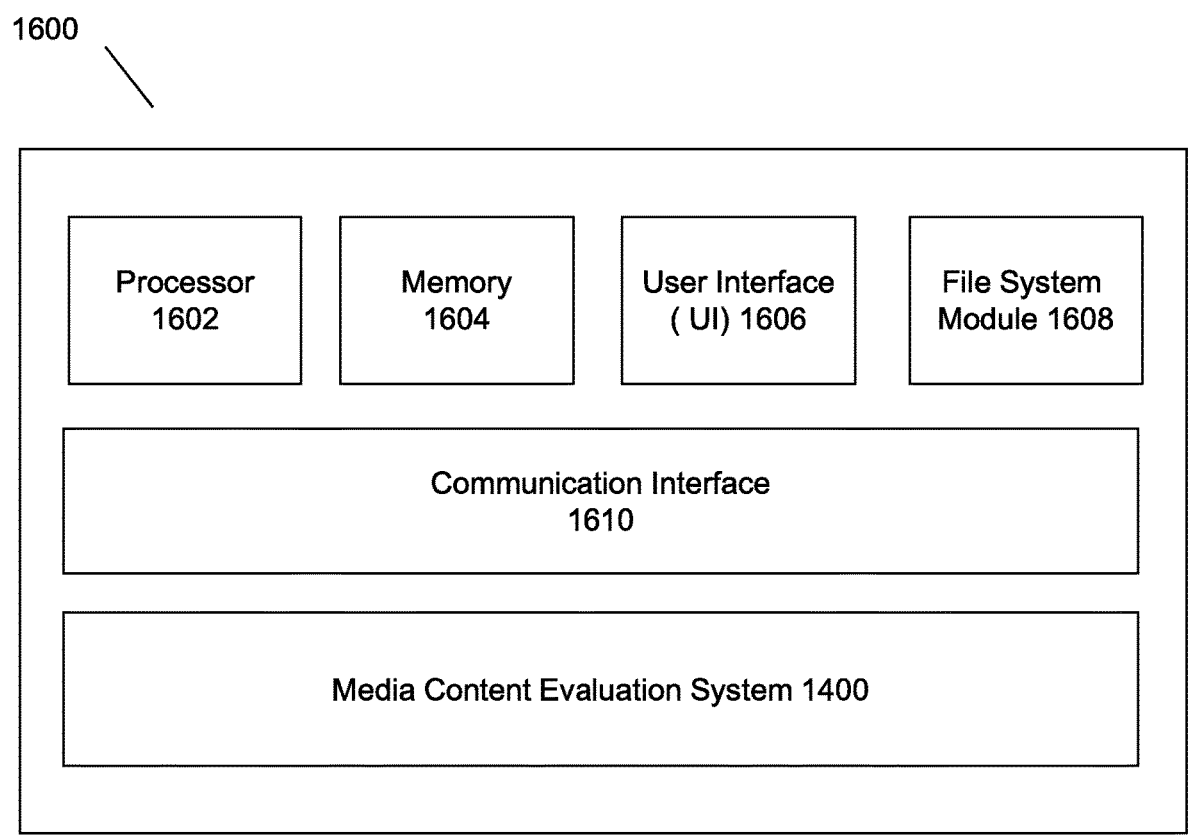
FIG. 16 illustrates a schematic diagram of an exemplary media content evaluation server in accordance with certain embodiments of the disclosed subject matter.

FIG. 16 illustrates a schematic diagram of an exemplary media content evaluation server in accordance with certain embodiments of the disclosed subject matter. The media content evaluation server 1600 can include a processor 1602, a memory 1604, a user interface (UI) 1606, a file system module 1608, a communication interface 1610, and a media content evaluation system 1400. One or more of these components are optional. One or more components can be added.

The processor 1602 can be hardware that is configured to execute computer readable instructions such as software that are provided from, for example, a non-transitory computer readable medium. The processor 1602 can be a general processor or be an application specific hardware (e.g., an application specific integrated circuit (ASIC), programmable logic array (PLA), field programmable gate array (FPGA), or any other integrated circuit). The processor 1602 can execute computer instructions or computer code to perform desired tasks. For example, the processor 1602 can execute computer instructions to serve as an authorization module, a configuration module, a certificate module, a seed module, a random number module, a clock module, an algorithm module, or an execution module, etc.

The memory 1604 can be a transitory or non-transitory computer readable medium, such as flash memory, a magnetic disk drive, an optical drive, a programmable read-only memory (PROM), a read-only memory (ROM), or any other memory or combination of memories. The memory 1604 can store a certificate, a seed, a random number, or an algorithm which can be parameters for generating security codes. The memory 1604 can also store computer instructions which can be executed by the processor 1604 to perform various functions of media content evaluation and optimization.

The UI 1606 can provide an interface for users to interact with the media content evaluation server 1600. The file system module 1608 can be configured to maintain a list of all data files, including both local data files and remote data files, in every folder in a file system. The file system module 1608 can be further configured to coordinate with the memory 1604 to store and cache files/data. The communication interface 1610 can allow the media content evaluation server 1600 to communicate with external resources (e.g., a network or a remote client/server). The media content evaluation server 1600 can also include a media content evaluation system 1400. The description of the media content evaluation system 1400 and its functionalities can be found in the earlier sections of this document.

The media content evaluation server 1600 can include additional modules, fewer modules, or any other suitable combination of modules that perform any suitable operation or combination of operations.

Features of the disclosed subject matter can be further illustrated in the following exemplary implementations. In Example 1, a method of estimating the value of media content via a social media platform can include the steps of:
   a) receiving a plurality of media content via a computer network, and exposing contents to a community;
   b) observing the actions taken by each of a plurality of users in a community who interact with the media content, wherein an action includes at least a user behavioral action and a user-engagement action [signal], and electronically associating these observations of user actions with media-content input data;
   c) observing the target actions taken by users with regard to each of a plurality of media content, wherein the value of a media content depends on the number of target actions taken in regard to a media content, and electronically associating these observations of target actions with media-content outcome data;
   d) providing a user with a reward for an indirect user-engagement action, wherein the reward depends on at least one of an indirect user-engagement action or a target action of another user;
   e) [aggregate] causing a first model builder to electronically construct a first model of the relationship between the media-content input data and the media-content output data, with the model constructed in a way to provide an estimate of the output data associated with a new media content from the input data associated with the new media content; and
   f) electronically outputting the estimate of the output data associated with a media content that is obtained from applying the first model constructed in step (e) to the input data associated with the media content.

In some variations of the implementation illustrated in Example 1, a media content is one of, or part of, a film, a TV show, music, a computer game, a social game, an ad, a short format video, a web series, marketing material, a test format, a pilot, a trailer, a commercial, an article, or a book. The user behavioral action is one of view, skip, forward, pause, rewind, comments, number of views, number of favorites, number of likes, number of dislikes, rewind, pause, scrubbing, tags, number of recs to friends, diffusion over network. Number of Rate, vote up/down, discuss content, tag specific parts of content up/down, add emoticons to stream, critiques, etc. The user engagement action is one of the selection of an emoticon, a facial expression, body language, textual, expression of emotion, a sharing decision, a vote, a like, an investment in an internal prediction market, a prediction of the popularity or revenue of a content, a prediction of how many friends will watch the content, a prediction of whether the content will receive investment, a completed survey. The target action is one of the number of views of a video, the number of users reaching a particular level in a game, the number of purchase events made of the media or a derivative media content, an indicator of a franchising opportunity, the number of views if extended to off platform, the monetary value of the content, the revenue over some time frame, the rank popularity of the content, the rank popularity of the content restricted to a genre, the rank popularity of the content restricted to a particular time period.

In some additional variations of the implementation illustrated in Example 1, the construction of a first model in step (e) is achieved through one of a generalized linear model, decision trees, boosted decision trees, support vector machines, graphical models, non-parametric methods, neural networks, linear regression, and hierarchical probabilistic models. The reward to a user in step (d) is determined through one of peer prediction, a function of the weight assigned to the input from the user in the first model constructed in step (e), the correlation between user actions and the gold standard action responses associated with the media content, the time of a user's input relative to the input of other users, how complementary a user's input is with the input of another user, the ranking of the utility of a user's inputs for estimation relative to others and position of the user on a leaderboard, and whether a user's input is pivotal for the estimate of the output for a given media content.

In some further variations of the implementation illustrated in Example 1, additional steps can include, prior to step (e), the steps of: receiving as input off-platform data representing the actions associated with the media content from social media and user-specific social networks and the world wide web, and extending the media-content input data to include this off-platform data.

In some further variations of the implementation illustrated in Example 1, additional steps can include the steps of:
   g) receiving as input an objective function, wherein the objective function provides a criterion by which to judge the quality of a media content on the basis of the outcome data associated with a media content, and electronically associating this objective function with objective description data;
   h) generating a plurality of estimates of output data for a plurality of media content by applying the first model constructed in step (e) to the input data associated with the plurality of media content, and electronically associating this estimates of output data with media-content estimated output data;
   i) causing a second model builder to electronically construct a second model comprised of (1) the objective description data, and (2) the media-content estimated output data; [use user input for measurement and refinement of content]

j) causing a solver/analyzer to electronically process the second model constructed in step (i) to determine a value score for each of at least two media content that is responsive to the objective function received as an input in step (g) and the estimates of the output data associated with the plurality of media content as determined in step (h); and k) electronically outputting the value score on at least one of the media content determined in step (j).

In some further variations of the implementation illustrated in Example 1, additional steps can include the steps of:

g) generating a plurality of estimates of output data for a plurality of media content by applying the first model constructed in step (e) to the input data associated with the plurality of media content, and electronically associating this estimates of output data with media-content estimated output data;

h) electronically sharing the media-content estimated output data with a plurality of bidders;

i) receiving as input from the plurality of bidders a plurality of bids, wherein each bid includes at least one media content and an associated bid price, and where the bid is for the right to at least one of: owning the content, leasing the content for a period of time, controlling the artistic development of the content, the right to control product placement or branding within the next version of the content, and marketing rights associated with the content, show an ad in response to a consumer impression associated with the content;

j) causing a winner determination solver to electronically process the bids received in step (i) to determine a winning allocation and one of a payment or payment terms for each bidder active in said allocation; and k) electronically outputting the allocation and the payments determined in step (j).

In some further variations of the implementation illustrated in Example 1, additional steps can include the steps of: (g) electronically sharing with users information about the estimated output data associated with each media content on the platform (or some aggregate of, e.g. probability to get investment).

In some further variations of the implementation illustrated in Example 1, additional steps can include the steps of: (g) allowing a user to share a media content on at least one of: a social network platform, the internet, a micro-blogging platform, a social blogging platform, and maybe social context more broadly: profile, friends, sharing, etc.

In some further variations of the implementation illustrated in Example 1, additional steps can include, prior to step (e), the steps of: filtering out user behavioral data or user engagement data on the basis of at least one of the following:
the user has not registered with the platform,
a characteristic of the user, including at least one of: gender, age, location, income, . . . interests, school, occupation, friends, hobbies, entertainment tastes, photograph, featured videos, professional skills, favorites, purchases, media consumption,
the past history of actions of the user on the platform,
the relationship between a user and another user on the platform, as determined through at least one of: a social connection through following, friends or sharing, a common friend, a similar usage pattern,
requiring that the training data comes from a diverse user base,
information about the number of friends a user has and network structure of friends on social networks.

In some further variations of the implementation illustrated in Example 1, additional steps can include the steps of: (g) allowing a user to create a derivative media content, this media content forming part then added to the set of media content received in step (a)

In some further variations of the implementation illustrated in Example 1, additional steps can include, prior to step (e), the steps of: controlling the access of a user to the plurality of media content by at least one of: prioritizing a user's access to a particular media content, by at least one of making it at the top of search results, showing it to a user before the user sees another content, requiring the user to interact with the content before interacting with another content; and blocking a user from access to a content. The control of the access of said user to the plurality of media content can depend on at least one of the past actions of the user, a characteristic of the user, or the relationship between input from the user and the estimated output data as prescribed by the model generated in step (e) of claim 1.

In some further variations of the implementation illustrated in Example 1, additional steps can include, prior to step (e), the steps of:

g) [democratic] selecting a media content for a recommendation to receive investment, this selection made in a way that depends on the aggregate behavioral and user engagement actions of users; and h) electronically outputting the media content identity and the recommendation.

In some further variations of the implementation illustrated in Example 1, the media-content input data also includes an electronic representation of at least one of:
the profile of each user associated with the input on each media content, longitudinal information about the interaction of the user with the platform, features associated with the content [genre, sequel, special effects, awards for cast, date, budget, reviews, plot, character, creativity . . . ]
data off platform [from social networks, social blogs, twitter, social platforms]
data off platform when a user checks into content off platform of one of the following: movie, TV show, and makes data available to the platform.

In some further variations of the implementation illustrated in Example 1, the reward in step (d) provides material benefit to a user in the form of at least one of: a prize, a discount, access to content, the right to upload, [leader boards, virtual awards, badges, etc.

In some further variations of the implementation illustrated in Example 1, the user is restricted in taking user engagement actions by at least one of the empirical distribution on the actions taken by a user and the total number of a particular type of action or the rate of a particular type of action.

In some further variations of the implementation illustrated in Example 1, the weight assigned to the inputs from a user in applying the first model constructed in step (e) to the input data associated with media content depends on at least one of:
the quantity of actions provided by a user on other media content,
the marginal improvement in accuracy to the estimated model in step (e) that comes from the actions of the user, the lifetime of the user in the community, the rate of recent actions of the user as it relates to historical action rates from the user.

In some further variations of the implementation illustrated in Example 1, additional steps can include the steps of:

g) generating a plurality of estimates of output data for a plurality of media content by applying the first model constructed in step (e) to the input data associated with the plurality of media content, and electronically associating this estimates of output data with media-content estimated output data;

h) electronically sharing the media-content estimated output data in a media content exchange with a plurality of media content owners and bidders;

i) receiving as input from the plurality of media content owners and bidders a plurality of asks and bids for the contents, wherein each ask includes at least one media content and an associated ask price and each bid includes at least one media content and an associated bid price;

j) causing a winner determination solver to electronically process the asks and bids received in step (i) to determine a winning allocation and a payment for each trade that clears from the bidder to the media content owners;

k) electronically outputting the allocation and the payments determined in step (j).

In some further variations of the implementation illustrated in Example 1, the objective function received in step (g) also specifies a first restriction on the users whose input data can be used for generating the predictive model in step (e) and specifies a second restriction on the users whose input data can be used in estimating the output data for a media content in step (h); and the objective function received in step (g) is associated also with meta-data to guide a decision about which users to engage with which media content in order to minimize the effect of the error in the estimates of output data on the objective.

In some further variations of the implementation illustrated in Example 1, additional steps can include the steps of:

l) selecting a first media content to receive incremental investment, this determination made in a way that depends on the value score determined for a content in step (j);

m) electronically outputting the identity of the first media content;

n) receiving as input a second media content, the second media content related to the first media content in one of the following ways: a derivative of the first media content, a sequel to the first media content, a variation in theme or style on the first media content, a different format to the first content; and o) repeating steps (b) through (n).

In some further variations of the implementation illustrated in Example 1, in step (l) the determination as to which media content receives investment is also made in a way that depends on the quantity of user actions received on the media content and the statistical significant of the estimated output data for the two media content.

In some further variations of the implementation illustrated in Example 1, additional steps can include the steps of:

g) estimating the distribution on the return on a plurality of media content if reproduced on the basis of incremental investment;

h) receiving as input the risk profile of an investor;

i) adopting the methods of portfolio theory to recommend an optimized investment strategy for the investor to maximize return on investment subject to risk preferences.

Embodiments of the disclosed subject matter can be implemented in computer hardware, firmware, and/or computer programs executing on programmable computers or servers that each includes a processor and a storage medium readable by the processor (including volatile and non-volatile memory and/or storage elements). Any computer program can be implemented in a high-level procedural or object-oriented programming language to communicate within and outside of computer-based systems. Any computer program can be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, can also be implemented as a machine-readable storage medium, configured with a computer program, where, upon execution, instructions in the computer program cause a machine to operate to perform the functions of the embodiments described above.

Embodiments of the disclosed subject matter can be used in a variety of applications. Although the embodiments, or portions thereof, are not limited in this respect, the embodiments, or portions thereof, can be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above can also be implemented using integrated circuit blocks referred to as main memory, cache memory, or other types of memory that store electronic instructions to be executed by a microprocessor or store data that may be used in arithmetic operations.

The descriptions herein are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory. While several particular forms of the disclosed subject matter have been described, it will be apparent that various modifications are possible. It is not intended that the disclosed subject matter be limited to the particular embodiments described here. Other advantages and novel features of the disclosed subject matter may become apparent from the detailed description when considered in conjunction with the drawings.

The above-presented description, including screen shots, pseudo-code, variables, elements and/or algorithmic steps, figures, images and illustrations is intended by way of example only and is not intended to limit the disclosed subject matter in any way. It is particularly noted that the persons skilled in the art can readily combine the various technical aspects of the various exemplary embodiments described as well as their constituent elements and subsystems to implement features and processes contemplated to be within the scope of the disclosed subject matter but not literally or explicitly described.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions.

What is claimed is:

1. A computer system for evaluating media content, the computer system comprising:
    a processor; and
    memory storing instructions that, when executed by the processor, cause the computer system to:
        receive, via an input interface, a media content;
        convert the media content to a different coding, format, or duration for presentation, over one or more networks, to users in an online community;
        determine a subset of the users in the online community;
        present the converted media content through a user interface to the subset of the users in the online community;
        receive, from the subset of the users in the online community, user input through a user engagement panel displayed on the user interface, the user input comprising informative signals relating to the media content and based on interactions with the user engagement panel, the interactions including reactions of the users in the subset of the users to the presented converted media content, wherein one user input represents a user behavior action or a user engagement action by one of the users in the subset of the users;
        restrict a number of user behavior actions or user engagement actions that the one of the users in the subset of the users is permitted to provide within a period of time;
        evaluate the media content based on the user input comprising informative signals relating to the media content and received from the subset of the users;
        generate an analysis result indicative of a popularity of the media content based on evaluating the media content based on the user input comprising informative signals relating to the media content and received from the subset of the users;
        determine a digital incentive to provide to a user device of the one of the users, the digital incentive based on the one user input having been predictive of the analysis result, wherein the digital incentive to the one of the users is distinct from the converted media content;
        construct a predictive computer model based on the media content and the analysis result indicative of the popularity of the media content;
        receive, via the input interface, a different media content;
        estimate, based on the predictive computer model, a different popularity of the different media content; and
        export, based on estimating the different popularity of the different media content, the different media content to a platform different from a platform associated with the media content.

2. The computer system of claim 1, wherein the instructions, when executed by the processor, cause the computer system to: determine the digital incentive to provide to the user device of the one of the users based on a weight assigned to an informative signal from the one of the users by a media content analyzer in evaluating the media content, the weight based on a measure of historical success of the one of the users in predicting whether different media content would be enjoyed by a different user.

3. The computer system of claim 1, wherein the instructions, when executed by the processor, cause the computer system to: assess the media content based on the analysis result indicative of a popularity of the media content and using an objective function received via the input interface.

4. The computer system of claim 3, wherein the instructions, when executed by the processor, cause the computer system to: determine whether the media content is to be modified and then presented again to a group of users in the online community for evaluation.

5. The computer system of claim 3, wherein the instructions, when executed by the processor, cause the computer system to: determine whether the media content is to be modified and then presented again to a group of users in the online community for evaluation, based on a number of transaction requests received for the media content.

6. The computer system of claim 1, wherein the instructions, when executed by the processor, cause the computer system to: evaluate the media content based on profile information of the users in the subset of the users.

7. The computer system of claim 1, wherein the instructions, when executed by the processor, cause the computer system to: control access of the users in the online community to the media content.

8. The computer system of claim 1, wherein the instructions, when executed by the processor, cause the computer system to: receive input associated with an emotion responsive to the media content when receiving the user input representing the user engagement action.

9. The computer system of claim 1, wherein the instructions, when executed by the processor, cause the computer system to:
    receive feedback relating to the media content;
    train the computer system to evaluate the media content based on the feedback relating to the media content; and
    prevent manipulation of the informative signals from the users in the subset of the users.

10. The computer system of claim 9, wherein the instructions, when executed by the processor, cause the computer system to: prevent the manipulation of the informative signals from the users in the subset of the users based on profile information of the users in the subset of the users.

11. The computer system of claim 1, wherein the instructions, when executed by the processor, cause the computer system to: prevent Sybil attacks by limiting a number of votes the one of the users can cast regarding the media content, the limiting based on a number of paths between the one of the users and other users in a social network.

12. The computer system of claim 1, wherein the instructions, when executed by the processor, cause the computer system to: determine the digital incentive to provide to the user device of the one of the users based on a time of the informative signal from the one of the users relative to time of informative signals from other users.

13. The computer system of claim 1, wherein the instructions, when executed by the processor, cause the computer system to: determine the digital incentive to provide to the user device of the one of the users based on a quality of the informative signal from the one of the users.

14. The computer system of claim 1, wherein the instructions, when executed by the processor, cause the computer system to: determine the digital incentive to provide to the user device of the one of the users based on a ranking of the informative signal from the one of the users among the informative signals from the other users.

15. The computer system of claim 1, wherein the instructions, when executed by the processor, cause the computer system to: receive input predicting a future quantity associated with the media content when receiving the user input representing the user engagement action.

16. The computer system of claim 1, wherein the instructions, when executed by the processor, cause the computer system to: filter a list of media content based on duration, genre, date of upload, view count, length, category, trending, popularity, rating by community, rating by friends, or recency.

17. The computer system of claim 1, wherein the instructions, when executed by the processor, cause the computer system to: determine a threshold for validity of a tag associated with the media content.

18. The computer system of claim 1, wherein the instructions, when executed by the processor, cause the computer system to:
determine whether the users in the online community have verified credentials in the online community; and
determine whether to accept a critique of the media content from the users in the online community based on whether the users in the online community have the verified credentials in the online community.

19. The computer system of claim 1, wherein the instructions, when executed by the processor, cause the computer system to: display, on the user engagement panel, a label, a platform score, a vote input mechanism, or an indication of friend interest.

20. A computerized method of evaluating media content, the computerized method comprising:
receiving, via an input interface and by a system comprising memory and a processor, a media content;
converting, by the system, the media content to a different coding, format, or duration for presentation, over one or more networks, to users in an online community;
determining, by the system, a subset of the users in the online community;
presenting, by the system, the converted media content through a user interface to the subset of the users in the online community;
receiving, by the system, from the subset of the users in the online community, user input through a user engagement panel displayed on the user interface, the user input comprising informative signals relating to the media content and based on interactions with the user engagement panel, the interactions including reactions of the users in the subset of the users to the presented converted media content, wherein one user input represents a user behavior action or a user engagement action by one of the users in the subset of the users;
restricting, by the system, a number of user behavior actions or user engagement actions that the one of the users in the subset of the users is permitted to provide within a period of time;
evaluating, by the system, the media content based on the user input comprising informative signals relating to the media content and received from the subset of the users;
generating, by the system, an analysis result indicative of a popularity of the media content based on the evaluating the media content based on the user input comprising informative signals relating to the media content and received from the subset of the users;
determining, by the system, a digital incentive to provide to a user device of the user, the digital incentive based on the one user input having been predictive of the analysis result, wherein the digital incentive to the one of the users is distinct from the converted media content;
constructing, by the system, a predictive computer model based on the media content and the analysis result indicative of the popularity of the media content;
receiving, via the input interface and by the system, a different media content;
estimating, by the system, based on the predictive computer model, a different popularity of the different media content; and
exporting, by the system, based on estimating the different popularity of the different media content, the different media content to a platform different from a platform associated with the media content.

21. The computerized method of claim 20, further comprising:
determining, by the system, the digital incentive to provide to the user device of the one of the users based on a weight assigned to an informative signal from the one of the users by a media content analyzer in evaluating the media content, the weight based on a measure of historical success of the one of the users in predicting whether different media content would be enjoyed by a different user.

22. The computerized method of claim 20, further comprising:
assessing, by the system, the media content based on the analysis result indicative of a popularity of the media content and using an objective function received via the input interface.

23. The computerized method of claim 20, further comprising:
determining, by the system, whether the media content is to be modified and then presented again to a group of users in the online community for evaluation.

24. The computerized method of claim 20, further comprising:
determining, by the system, whether the media content is to be modified and then presented again to a group of users in the online community for evaluation, based on a number of transaction requests received for the media content.

25. The computerized method of claim 20, further comprising:
evaluating, by the system, the media content based on profile information of the users in the subset of the users.

26. The computerized method of claim 20, further comprising:
facilitating, by the system, transactions of the media content.

27. The computerized method of claim 20, wherein the user engagement action comprises receiving input associated with an emotion responsive to the media content when receiving the user input representing the user engagement action.

28. The computerized method of claim 20, further comprising:
receiving, by the system, feedback relating to the media content;
training, by the system, to evaluate the media content based on the feedback relating to the media content; and
preventing, by the system, manipulation of the informative signals from the users in the subset of the users.

29. The computerized method of claim 28, further comprising:
preventing, by the system, manipulation of the informative signals from the users in the subset of the users at least partially based on profile information of the users in the subset of the users.

30. One or more non-transitory computer-readable media storing executable instructions that, when executed by a processor, cause a system to:
receive, via an input interface, a media content;
convert the media content to a different coding, format, or duration for presentation, over one or more networks, to users in an online community;
determine a subset of the users in the online community;
present the converted media content through a user interface to the subset of the users in the online community;
receive, from the subset of the users in the online community, user input through a user engagement panel displayed on the user interface, the user input comprising informative signals relating to the media content and based on interactions with the user engagement panel, the interactions including reactions of the users in the subset of the users to the presented converted media content, wherein one user input represents a user behavior action or a user engagement action by one of the users in the subset of the users;
restrict a number of user behavior actions or user engagement actions that the one of the users in the subset of the users is permitted to provide within a period of time;
evaluate the media content based on the user input comprising informative signals relating to the media content and received from the subset of the users;
generate an analysis result indicative of a popularity of the media content based on evaluating the media content based on the user input comprising informative signals relating to the media content and received from the subset of the users;
determine a digital incentive to provide to a user device of the one of the users, the digital incentive based on the one user input having been predictive of the analysis result, wherein the digital incentive to the one of the users is distinct from the converted media content;
construct a predictive computer model based on the media content and the analysis result indicative of the popularity of the media content;
receive, via the input interface, a different media content;
estimate, based on the predictive computer model, a different popularity of the different media content; and
export, based on estimating the different popularity of the different media content, the different media content to a platform different from a platform associated with the media content.

31. The one or more non-transitory computer-readable media of claim 30, wherein the instructions, when executed by the processor, cause the system to: determine the digital incentive to provide to the user device of the one of the users based on a weight assigned to an informative signal from the one of the users by a media content analyzer in evaluating the media content, the weight based on a measure of historical success of the one of the users in predicting whether different media content would be enjoyed by a different user.

32. The one or more non-transitory computer-readable media of claim 30, wherein the instructions, when executed by the processor, cause the system to: assess the media content based on the analysis result indicative of a popularity of the media content and using an objective function received via the input interface.

33. The one or more non-transitory computer-readable media of claim 30, wherein the instructions, when executed by the processor, cause the system to: determine whether the media content is to be modified and then presented again to a group of users in the online community for evaluation.

34. The one or more non-transitory computer-readable media of claim 30, wherein the instructions, when executed by the processor, cause the system to:
receive feedback relating to the media content;
train the system to evaluate the media content based on the feedback relating to the media content; and
prevent manipulation of the informative signals from the users in the subset of the users.

* * * * *